(12) United States Patent
Machida et al.

(10) Patent No.: US 7,189,788 B2
(45) Date of Patent: Mar. 13, 2007

(54) POLYOLEFIN RESIN COMPOSITION

(75) Inventors: Shuji Machida, Chiba (JP); Yutaka Kobayashi, Chiba (JP); Hideo Kusuyama, Chiba (JP); Akira Tanaka, Chiba (JP)

(73) Assignee: Idemitsu Kosan Co. Ltd., Tokyo (JP)

( * ) Notice: Subject to any disclaimer, the term of this patent is extended or adjusted under 35 U.S.C. 154(b) by 228 days.

(21) Appl. No.: 10/482,418

(22) PCT Filed: Jul. 2, 2002

(86) PCT No.: PCT/JP02/06693

§ 371 (c)(1), (2), (4) Date: Jan. 12, 2004

(87) PCT Pub. No.: WO03/008497

PCT Pub. Date: Jan. 30, 2003

(65) Prior Publication Data

US 2004/0176520 A1  Sep. 9, 2004

(30) Foreign Application Priority Data

| Jul. 12, 2001 | (JP) | ............................. 2001-212381 |
| Jul. 12, 2001 | (JP) | ............................. 2001-212476 |
| Jul. 12, 2001 | (JP) | ............................. 2001-212477 |
| Jul. 13, 2001 | (JP) | ............................. 2001-213444 |

(51) Int. Cl.
C08L 23/10 (2006.01)

(52) U.S. Cl. ...................... 525/240; 525/322; 525/323; 525/88; 524/451

(58) Field of Classification Search ................ 525/240, 525/322, 323, 88; 524/451
See application file for complete search history.

(56) References Cited

U.S. PATENT DOCUMENTS

| 4,948,841 | A | * | 8/1990 | Kasahara et al. ............ 525/240 |
| 5,250,629 | A | | 10/1993 | Tani et al. |
| 5,362,814 | A | | 11/1994 | Machida et al. |
| 5,554,695 | A | | 9/1996 | Machida et al. |
| 5,608,009 | A | | 3/1997 | Machida et al. |
| 5,670,580 | A | | 9/1997 | Tazaki et al. |
| 5,739,225 | A | | 4/1998 | Tazaki et al. |
| 5,747,620 | A | | 5/1998 | Machida et al. |
| 5,829,804 | A | * | 11/1998 | Saeki et al. ................. 293/120 |
| 5,955,557 | A | | 9/1999 | Machida et al. |
| 5,973,070 | A | | 10/1999 | Baann |
| 6,169,154 | B1 | | 1/2001 | Machida et al. |
| 6,201,090 | B1 | * | 3/2001 | Sumitomo et al. .......... 526/348 |
| 6,573,352 | B1 | | 6/2003 | Tatsumi et al. |

FOREIGN PATENT DOCUMENTS

| EP | 0 739 939 | 10/1996 |
| EP | 739939 | 10/1996 |
| EP | 0 831 125 | 3/1998 |
| JP | 5-262817 | 10/1993 |
| JP | 8-269295 | 10/1996 |
| JP | 2000-38420 | 2/2000 |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

The polyolefin-based resin composition (I) of the present invention comprises (A) 99.9 to 80% by mass of a propylene (co)polymer having (a) a melt flow rate (MFR) of 0.1 to 200 g/10 min, (b) a meso-pentad fraction [mmmm] of an ordinary temperature (25° C.) xylene-insoluble component of 97.0% or higher, and (c) a content of an ordinary temperature (25° C.) xylene-soluble component of 4 to 50% by mass; and (B) 0.1 to 20% by mass of a copolymer containing propylene chains of an isotactic structure, and copolymer chains constituted from at least two monomer units selected from the group consisting of ethylene, $C_3$ to $C_{20}$ α-olefins, cyclic olefins and aromatic vinyl monomers which are graft-bonded and/or block-bonded to said copolymer, and exhibits not only a high rigidity but also a highly enhanced impact strength and is well-balanced between the physical properties thereof.

8 Claims, No Drawings

POLYOLEFIN RESIN COMPOSITION

TECHNICAL FIELD

The present invention relates to polyolefin-based resin compositions, and more particularly to polyolefin-based resin compositions (I) that not only have a high rigidity but also are highly enhanced in impact strength, and are capable of realizing rationalization of production process thereof as well as reduction in production costs mainly in the field of industrial materials; polyolefin-based resin compositions (II) capable of achieving a high rigidity and a high impact strength which are required in the field of industrial materials without using high-performance catalysts or special polymerization methods; inorganic filler-reinforced polyolefin-based resin compositions (III) that are well-balanced between fluidity, rigidity and impact strength and are capable of realizing reduction in thickness and weight of molded articles prepared therefrom; and polyolefin-based resin compositions (IV) that not only exhibit a high rigidity but also are highly enhanced in impact strength, and are capable of realizing reduction in thickness and weight in the field of industrial materials such as automobile exterior trims.

BACKGROUND ARTS

Hitherto, it is known that polypropylene-based resins have a light weight, and exhibit excellent mechanical strength and moldability. In particular, propylene homopolymers produced using a high-stereoregular catalyst, or so-called propylene-ethylene block copolymers in which ethylene-propylene copolymerization moieties are scattered in a matrix composed of the propylene homopolymer, have been extensively and increasingly used in the field of industrial materials, e.g., transportation materials such as containers and pallets, automobile interior and exterior trims, etc., because of excellent rigidity and impact strength thereof.

In recent years, it has been required that automobile interior trims such as door trims and pillars are rationalized in their production process to reduce production costs thereof. For this reason, positive studies have been made to replace conventional polypropylene/rubber/talc blended type materials with single polypropylene-based materials.

On the other hand, in the field of other industrial materials, the need for reduction in thickness and weight thereof have also been increased. Therefore, it has been required that the polypropylene-based resins are extremely highly improved in properties thereof. To meet these requirements, the application of high-performance catalysts and optimization of design of resins have been attempted. However, only the use of the respective methods has failed to obtain polypropylene-based resins having sufficient properties. Thus, it has been still demanded to develop industrial materials that show a higher rigidity, and are improved in their physical properties such as impact strength.

Also, in recent years, it has been required to supply automobile parts having the same specification and quality as well as materials thereof to not only domestic facilities but also overseas production facilities from the viewpoints of both costs and quality.

Hitherto, as to automobile materials for domestic needs, polypropylene resins satisfying qualities required therefor are produced and supplied by using ultrahigh-performance catalysts and peculiar polymerization methods developed by respective polypropylene makers. However, in overseas polypropylene plants where costs have a superiority to others, in order to procure low-cost materials having the same quality as that for domestic needs, there are essentially required large-scale modification of facilities, replacement of catalysts used, additional processes for production of alternatives, etc., which are disadvantageous from economical viewpoints.

Therefore, it has been expected that the respective polypropylene makers develop techniques for producing automobile materials having the same quality as that of domestic ones, even though overseas general polypropylene that has a high productivity and is highly competitive in costs, is used as a base material thereof.

In addition, hitherto, automobile parts such as center console, cowl top and air cleaner casing have been made of a reinforced material prepared by adding an inorganic filler such as talc to the polypropylene resin. With the increasing tendency of reduction in weight of automobiles, it has been demanded to develop materials having a good moldability, a high rigidity and a high impact strength which can realize further reduction in thickness and weight of products as compared to conventional materials.

In general, when the fluidity of polypropylene is increased to attain a good moldability thereof, the polypropylene tends to be deteriorated in impact resistance. Whereas, when the amount of inorganic filler added to polypropylene is increased to improve a rigidity thereof, the polypropylene has an increased specific gravity, thereby failing to achieve the aimed reduction in weight of products. For this reason, it has been demanded to provide materials that are well-balanced between moldability, rigidity and impact strength.

Also, automobile exterior trims such as typically bumpers have been conventionally made of a rubber-modified polypropylene resin material prepared by adding and blending a rubber component in a polypropylene resin. With the recent tendency of reduction in weight of automobiles, it has been required to provide materials exhibiting a good moldability, a high fluidity, a high rigidity and a high impact resistance which can realize still further reduction in weight of products as compared to conventional ones.

In general, when the fluidity of the polypropylene resin is increased to attain a good moldability thereof, the polypropylene resin tends to be deteriorated in impact strength. Therefore, it has been demanded to develop materials that are well-balanced between moldability, rigidity and impact strength.

Meanwhile, Japanese Patent Application Laid-open No. Hei 5-320449 discloses the resin composition composed of a graft copolymer which is produced by graft-polymerizing a styrene-based monomer to a high-molecular polymer having polymerizable carbon-carbon double bonds in side chains thereof, and contains styrene-based monomer unit chains having a highly syndiotactic stereoregular structure, as well as a thermoplastic resin and an inorganic filler. Further, in this Japanese Patent Application, it is described that an example of the thermoplastic resin is polypropylene, but since the polypropylene is described merely as an example of the thermoplastic resin, properties thereof such as melt flow rate are not specified therein. In addition, the thermoplastic resins described in Examples of the above Japanese Patent Application are composed of syndiotactic polystyrene as a main component and ethylene-propylene copolymer as a subsidiary component. Therefore, the technique described in the above Japanese Patent Application is quite different from the present invention using the specific polypropylene.

DISCLOSURE OF THE INVENTION

In view of the above problems, an object of the present invention is to provide a polyolefin-based resin composition (I) that not only exhibits a high rigidity, but also is highly improved in impact strength. Another object of the present invention is to provide a polyolefin-based resin composition (II) capable of achieving a high rigidity and a high impact strength required in the field of industrial materials without using high-performance catalysts and employing special polymerization methods. Further, a further object of the present invention is to provide polyolefin-based resin compositions (III) and (IV) that not only exhibit a high rigidity, but also are highly improved in impact strength.

As a result of extensive researches for solving the above problems, the present inventors have found that when a specific amount of an olefin-based copolymer having a specific structure is added to a polypropylene-based resin, it is possible to obtain the polyolefin-based resin composition (I) that not only exhibits a high rigidity, but also is highly improved in impact strength; the polyolefin-based resin composition (II) capable of achieving a high rigidity and a high impact strength required in the field of industrial materials without using high-performance catalysts and employing special polymerization methods; and the polyolefin-based resin compositions (III) and (IV) that not only exhibit a high rigidity, but also are highly improved in impact strength. The present invention has been accomplished on the basis of this finding.

Thus, the present invention provides a polyolefin-based resin composition (I) comprising:

(A) 99.9 to 80% by mass of a propylene (co)polymer having (a) a melt flow rate (MFR) of 0.1 to 200 g/10 min, (b) a meso-pentad fraction [mmmm] of an ordinary temperature (25° C.) xylene-insoluble component of 97.0% or higher, and (c) a content of an ordinary temperature (25° C.) xylene-soluble component of 4 to 50% by mass; and (B) 0.1 to 20% by mass of a copolymer containing propylene chains of an isotactic structure, and copolymer chains constituted from at least two monomer units selected from the group consisting of ethylene, $C_3$ to $C_{20}$ α-olefins, cyclic olefins and aromatic vinyl monomers which are graft-bonded and/or block-bonded to said copolymer.

Also, the present invention provides a polyolefin-based resin composition (II) comprising:

(A) 99.9 to 80% by mass of a propylene (co)polymer having (a) a melt flow rate (MFR) of 0.1 to 200 g/10 min, (b) a meso-pentad fraction [mmmm] of an ordinary temperature (25° C.) xylene-insoluble component of 94.0% or higher and less than 97%, and (c) a content of an ordinary temperature (25° C.) xylene-soluble component of 4 to 50% by mass; and (B) 0.1 to 20% by mass of a copolymer containing propylene chains of an isotactic structure, and copolymer chains constituted from at least two monomer units selected from the group consisting of ethylene, $C_3$ to $C_{20}$ α-olefins, cyclic olefins and aromatic vinyl monomers which are graft-bonded and/or block-bonded to said copolymer.

Further, the present invention provides a polyolefin-based resin composition (III) comprising:

100 parts by mass of a mixture comprising (A) 99.9 to 80% by mass of a propylene (co)polymer having (a) a melt flow rate (MFR) of 0.1 to 200 g/10 min and (b) a content of an ordinary temperature (25° C.) xylene-soluble component of 4 to 50% by mass, and (B) 0.1 to 20% by mass of a copolymer containing propylene chains of an isotactic structure, and copolymer chains constituted from at least two monomer units selected from the group consisting of ethylene, $C_3$ to $C_{20}$ α-olefins, cyclic olefins and aromatic vinyl monomers which are graft-bonded and/or block-bonded to said copolymer; and (C) 3 to 40 parts by mass of an inorganic filler.

In addition, the present invention provides a polyolefin-based resin composition (IV) comprising:

(A) a propylene (co)polymer having (a) a melt flow rate (MFR) of 0.1 to 200 g/10 min and (b) a meso-pentad fraction [mmmm] of an ordinary temperature (25° C.) xylene-insoluble component of 94.0% or higher;

(B) a copolymer containing polypropylene chains of an isotactic structure, and copolymer chains constituted from at least two monomer units selected from the group consisting of ethylene, $C_3$ to $C_{20}$ α-olefins, cyclic olefins and aromatic vinyl monomers which are graft-bonded and/or block-bonded to said copolymer;

(C) at least one inorganic filler selected from the group consisting of talc, mica and wollastonite; and (D) at least one rubber component selected from the group consisting of ethylene-$C_3$ or more α-olefin copolymer elastomers, hydrogenated elastomers of styrene-diene copolymers and hydrogenated elastomers of diene (co)polymers, said component (B) being contained in an amount of 0.1 to 20 parts by mass based on 100 parts by mass of a mixture containing the components (A), (C) and (D) at a mass ratio of (A)/(C)/(D) of 95 to 40/0 to 30/5 to 30.

PREFERRED EMBODIMENT TO CARRY OUT THE INVENTION

First, the polyolefin-based resin compositions (I) and (II) of the present invention are explained. In the polyolefin-based resin composition (I) of the present invention, the propylene (co)polymer (A) satisfies (a) a melt flow rate (MFR) of 0.1 to 200 g/10 min, (b) a meso-pentad fraction [mmmm] of an ordinary temperature (25° C.) xylene-insoluble component of 97.0% or higher, and (c) a content of an ordinary temperature (25° C.) xylene-soluble component of 4 to 50% by mass. Also, in the polyolefin-based resin composition (II) of the present invention, the propylene (co)polymer (A) satisfies (a) a melt flow rate (MFR) of 0.1 to 200 g/10 min, (b) a meso-pentad fraction [mmmm] of an ordinary temperature (25° C.) xylene-insoluble component of 94.0% or higher and less than 97.0%, and (c) a content of an ordinary temperature (25° C.) xylene-soluble component of 4 to 50% by mass.

The method for production of the propylene (co)polymer (A) used in the respective polyolefin-based resin compositions (I) and (II) of the present invention is not particularly restricted as far as the obtained propylene (co)polymer (A) can satisfy the above requirements (a) to (c). In general, the propylene (co)polymer (A) may be produced in the presence of a so-called Ziegler-Natta catalyst containing as essential components, a transition metal compound containing a metal element of Groups 4 to 6 of the Periodic Table, and an organometallic compound containing a metal element of Groups 1 to 3 and 11 to 13 of the Periodic Table as described in Japanese Patent Application Laid-open Nos. Sho 58-138715, Sho 61-209207, Sho 62-104810, Sho 62-104811, Sho 62-104812, Sho 62-104813, Hei 1-311106, Hei 1-318011 and Hei 2-84404, etc. The melt flow rate (a) of the propylene (co)polymer (A) may be controlled mainly by an amount of a chain transfer agent such as hydrogen which is used upon polymerization, and the meso-pentad fraction [mmmm] (b) of an ordinary temperature (25° C.) xylene-insoluble component thereof can be controlled mainly by the kind of Ziegler-Natta catalyst used. Also, in the case where the propylene (co)polymer (A) is a propylene homopolymer, the content (c) of an ordinary temperature (25° C.) xylene-soluble component thereof may be controlled mainly by the kind of Ziegler-Natta catalyst used similarly to the above (b). In the case where the propylene (co)polymer (A) is a copolymer of propylene with the other olefin, the content (c) of an ordinary temperature (25° C.) xylene-soluble component thereof may be controlled mainly by an amount of the comonomer or an amount of copolymerization moieties therein.

The propylene (co)polymer (A) may be used singly or in combination of any two or more kinds thereof. Further, the propylene (co)polymer (A) may contain, if required, additives such as neutralizing agents, antioxidants, weather-resisting agents and antistatic agents unless the addition thereof adversely affects the effects of the present invention.

When the MFR of the propylene (co)polymer (A) is less than 0.1 g/10 min, the obtained composition tends to be considerably deteriorated in moldability. When the MFR of the propylene (co)polymer (A) exceeds 200 g/10 min, the obtained composition tends to be insufficient in mechanical properties. In order to exhibit the effects of the present invention at best, the MFR of the propylene (co)polymer (A) is preferably 10 to 200 g/10 min and more preferably 10 to 100 g/10 min. The MFR is the value measured at 230° C. under a load of 21.18 N according to JIS K7210.

In the polyolefin-based resin composition (I), the component (A) is required to show a sufficient meso-pentad fraction [mmmm] of an ordinary temperature (25° C.) xylene-insoluble component thereof which can allow the obtained resin composition to exhibit a sufficient rigidity. To meet the requirement, the component (A) is essentially required to have a meso-pentad fraction [mmmm] of an ordinary temperature (25° C.) xylene-insoluble component of 97.0% or higher and preferably 97.2% or higher.

In the polyolefin-based resin composition (II), the component (A) is also required to show a sufficient meso-pentad fraction [mmmm] of an ordinary temperature (25° C.) xylene-insoluble component thereof which can allow the obtained resin composition to exhibit an adequate rigidity. To meet the requirement, the component (A) is essentially required to have a meso-pentad fraction [mmmm] of an ordinary temperature (25° C.) xylene-insoluble component of 94.0% or higher. On the other hand, even if it is intended to produce the component (A) having a meso-pentad fraction [mmmm] of an ordinary temperature (25° C.) xylene-insoluble component of 97.0% or higher, the use of high-performance catalysts or additional steps for removal of low-stereoregular components, etc., are required, resulting in disadvantages such as high catalyst costs, high utility costs and low productivity. Therefor, the meso-pentad fraction [mmmm] of an ordinary temperature (25° C.) xylene-insoluble component of the component (A) used in the polyolefin-based resin composition (II) is preferably 94.0 to 96.5%.

Also, when the content of an ordinary temperature (25° C.) xylene-soluble component of the component (A) is less than 4% by mass, the obtained composition tends to be insufficient in impact strength. When the content of an ordinary temperature (25° C.) xylene-soluble component of the component (A) exceeds 50% by mass, the obtained composition tends to be deteriorated in rigidity. If the resin composition is used in the fields of transportation materials and automobile interior trims, the content of an ordinary temperature (25° C.) xylene-soluble component of the component (A) is suitably in the range of 4 to 25% by mass in view of a good balance between rigidity and impact strength. If the resin composition is used in the field of automobile exterior trims such as bumpers requiring a high impact strength, the content of an ordinary temperature (25° C.) xylene-soluble component of the component (A) is suitably in the range of 10 to 50% by mass.

The above ordinary temperature (25° C.) xylene-soluble and xylene-insoluble components are determined by the following methods.

(1) 5±0.05 g of a sample is accurately weighed and placed in a 1,000 ml egg plant-type flask. After 1.0 g of BHT (antioxidant) is added to the flask, a rotor and 700 ml of p-xylene are charged into the flask.

(2) A cooler is fitted to the egg plant-type flask, and the contents of the flask are heated in an oil bath at 140±5° C. for 120 minutes while operating the rotor to dissolve the sample in p-xylene.

(3) After the obtained solution in the flask is poured into a 1,000 ml beaker, the solution in the beaker is allowed to stand until it is cooled to room temperature (25° C.) (for 8 hours or longer) while stirring by a stirrer, and then the resultant precipitate is separated by filtration.

(4) After 2,000 ml of methanol is placed in a 3,000 ml beaker, a filtrate obtained in the above (3) is poured into the beaker, and allowed to stand at room temperature (25° C.) for 2 hours or longer while stirring by stirrer.

(5) The obtained precipitate is separated by filtration, air-dried for 5 hours or longer, and then dried at a temperature of 100±5° C. for 240 to 270 minutes using a vacuum dryer to recover a 25° C. xylene-soluble component.

(6) On the other hand, a whole amount of the precipitate obtained in the above (3) is dissolved again together with 1.0 g of BHT in 700 ml of p-xylene according to the method described in the above (2). Then, the obtained solution in a hot state is rapidly transferred into a 3,000 ml beaker previously filled with 2,000 ml of methanol, and stirred by a stirrer for 2 hours or longer, followed by allowing the solution to stand at room temperature (25° C.) for 8 hours o longer.

(7) The resultant precipitate is separated by filtration, and dried according to the method described in the above (5) to recover an ordinary temperature (25° C.) xylene-insoluble component.

The content (W) of the 25° C. xylene-soluble component is represented by the following formula:

$$W(\% \text{ by mass}) = 100 \times C/A$$

wherein A is a weight (g) of the sample; and C is a weight (g) of the soluble component recovered in the above (5).

Also, the content of the xylene-insoluble component is represented by the formula: (100−W)% by mass.

The meso-pentad fraction [mmmm] used in the present invention means a meso fraction of pentad units in polypropylene molecule chains as measured from signals of methyl groups in $^{13}$C-NMR spectra according to the method proposed in A. Zambelli et al., "Macromolecules", 6, p. 925 (1973). The $^{13}$C-NMR spectra are measured according to peak attribution proposed in A. Zambelli et al., "Macromolecules", 8, p. 687 (1975) using the following apparatus under the following conditions.

Apparatus: JNM-EX 400 Model $^{13}$C-NMR apparatus available from Nippon Denshi Co., Ltd.;
Method: Proton Complete Decoupling Method;
Sample concentration: 220 mg/ml;
Solvent: mixed solvent of 1,2,4-trichlorobenzene and heavy benzene (volume ratio: 90:10);

Measuring temperature: 130° C.;
Pulse width: 45°;
Pulse repetition period: 4 seconds; and
Cumulative frequency: 1,000 times The component (B) is a copolymer composed of propylene chains having an isotactic structure, and copolymer chains constituted from at least two monomer units selected from the group consisting of ethylene, $C_3$ to $C_{20}$ α-olefins, cyclic olefins and aromatic vinyl monomers which are graft-bonded and/or block-bonded to the copolymer.

Examples of the $C_3$ to $C_{20}$ α-olefins include α-olefins such as propylene, 1-butene, 3-methyl-1-butene, 4-phenyl-1-butene, 1-pentene, 3-methyl-1-pentene, 4-methyl-1-pentene, 3,3-dimethyl-1-pentene, 3,4-dimethyl-1-pentene, 4,4-dimethyl-1-pentene, 1-hexene, 4-methyl-1-hexene, 5-methyl-1-hexene, 6-phenyl-1-hexene, 1-octene, 1-decene, 1-dodecene, 1-tetradecene, 1-hexadecene, 1-octadecene, 1-eicosene, vinyl cyclohexane and 5-ethylidene-2-norbornene; and halogen-substituted α-olefins such as hexafluoropropene, tetrafluoroethylene, 2-fluoropropene, fluoroethylene, 1,1-difluoroethylene, 3-fluoropropene, trifluoroethylene and 3,4-dichloro-1-butene.

Examples of the cyclic olefins include monocyclic olefins such as cyclopentene; and polycyclic olefins such as norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8 dimethano-1,2,3,4,4a,5,8,8a-octahydronaphthalene, 2-isobutyl-1,4,5,8-dimethano-1,2,3,4,4a, 5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxynorborneneanhydrate, 5-dimethylaminonorbornene and 5-cyanonorbornene.

Examples of the aromatic vinyl monomers include alkylstyrenes such as styrene, p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene and 3,5-dimethylstyrene; alkoxystyrenes such as p-methoxystyrene, o-methoxystyrene and m-methoxystyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluororstyrene; trimethylsilylstyrene; vinyl benzoic acid esters; or the like.

Examples of the copolymers as the component (B) include copolymers [(B)-1] having a graft bonding site formed by an olefin-based macromonomer and/or a polyene; copolymers [(B)-2] having a block bonding site produced in the course of polymerization; and copolymers [(B)-3] having both the graft bonding site defined by [(B)-1] and the block bonding site defined by [(B)-2]. The above olefin-based macromonomer means a polymer containing vinyl groups at ends of its main chain, and may be produced, for example, by polymerizing ethylene or propylene in the presence of an appropriately selected catalyst. The above block bonding site produced in the course of polymerization means such a condition in which chains that are different in at least one of kind of monomer, stereoregularity and copolymer composition from each other, form a covalent bond.

The polyenes usable in the present invention are not particularly restricted as long as they contain at least two polymerizable carbon-to-carbon double bonds in one molecule thereof. Examples of the polyenes include α, ω-type polyenes such as 1,3-butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,13-tetradecadiene, 1,15-hexadecadiene, 4,4-dimethyl-1,9-decadiene, 1,5,9-decatriene, 5-allyl-1,9-decadiene and 1,19-eicodiene; styrene-type polyenes such as p-divinylbenzene, m-divinylbenzene, o-divinylbenzene, di(p-vinylphenyl)methane, 1,3-bis(p-vinylphenyl)propane and 1,5-bis(p-vinylphenyl)pentane; cyclic polyenes such as 5-vinyl-2-norbornene, 5-isopropylidne-2-norbornene, dicyclopentadiene, dimethyldicyclopentadiene, diethyldicyclopentadiene, as well as

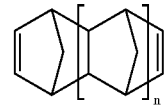

wherein n is 0, 1 or 2, bicyclo[2.2.1]hepto-2,5-diene:

tetracyclo[4.4.0.1$^{2,5}$.1$^{7,10}$]-3,8-dodecadiene:

hexacyclo[6.6.1.1$^{3,6}$.1$^{10,13}$.0$^{2,7}$.0$^{9,14}$]-4,11-heptadecadiene:

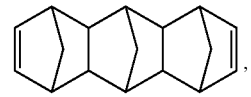

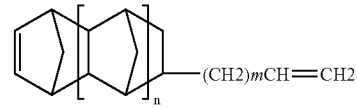

wherein n is 0, 1 or 21 and m is an integer of 1 to 11, 5-allyl bicyclo[2.2.1]hepto-2-ene:

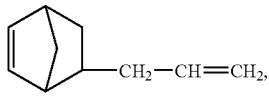

5-(3-butenyl)bicyclo[2.2.1]hepto-2-ene:

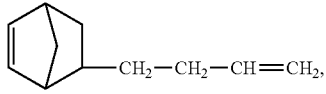

8-vinyl tetracyclo[4.4.0.1$^{2,5}$.1$^{7,10}$]-3-dodecene:

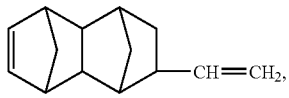

11-vinyl hexacyclo[6.6.1.1$^{3,6}$.1$^{10,13}$.0$^{2,7}$.0$^{9,14}$]-4-heptadecene:

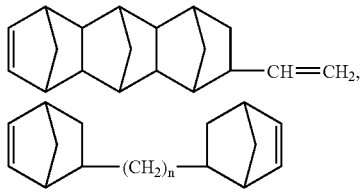

wherein n is an integer of 0 to 6, 1,1-bis(5-bicyclo[2.2.1]hept-2-enyl)methane:

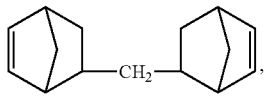

1,2-bis(5-bicyclo[2.2.1]hept-2-enyl)ethane:

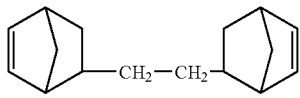

and 1,6-bis(5-bicyclo[2.2.1]hept-2-enyl)hexane:

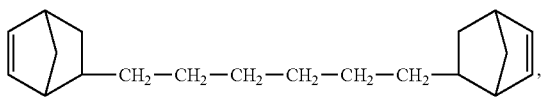

styrene/α-olefin-type polyenes having a styrene residue and an α-olefin residue in the same molecule, such as p-(2-propenyl)styrene, m-(2-propenyl)styrene, p-(3-butenyl)styrene, m-(3-butenyl)styrene, o-(3-butenyl)styrene, p-(4-pentenyl)styrene, m-(4-pentenyl)styrene, o-(4-pentenyl)styrene, p-(5-propenyl)styrene, p-(7-octenyl)styrene, p-(1-methyl-3-butenyl)styrene, p-(2-methyl-3-butenyl)styrene, o-(2-methyl-3-butenyl)styrene, p-(3-methyl-3-butenyl)styrene, p-(2-ethyl-3-butenyl)styrene, p-(2-ethyl-4-pentenyl)styrene, p-(3-butenyl)-α-methyl styrene, m-(3-butenyl)-α-methyl styrene, o-(3-butenyl)-α-methyl styrene, 4-vinyl-4'-(3-butenyl)biphenyl, 4-vinyl-3'-(3-butenyl)biphenyl, 4-vinyl-4'-(4-pentenyl)biphenyl, 4-vinyl-2'-(4-pentenyl)biphenyl and 4-vinyl-4'-(2-methyl-3-butenyl)biphenyl; other polyenes such as 1,4-cyclohexadiene, 1,5-cyclooctadiene, 1,5-cyclododecadiene, 4-vinyl cyclohexane, 1-allyl-4-isopropylidene cyclohexane, 3-allyl cyclopentene, 4-allyl cyclohexene and 1-isopropenyl-4-(4-butenyl)cyclohexane; or the like.

In the present invention, of these polyenes, preferred are α, ω-type polyenes, styrene-type polyenes, cyclic polyenes and styrene/α-olefin-type polyenes, since these polyenes have high-reactive carbon-to-carbon double bonds and, therefore, can reduce residual unsaturated groups that tend to deteriorate the thermal stability upon production of the composition.

The above copolymer (B) is explained in detail with reference to the following items [1] to [4]:

[1] Copolymer [(B)-1] Having Graft Bonds (1) Copolymer Structure

Graft copolymer produced by polymerization reaction via macromonomer, graft copolymer having a graft structure based on polyene, or graft copolymer having a graft structure constituted from both macromonomer and polyene.

(2) Parameters of Graft Structure (i) Branching Length and Branching Number

The length of the branched chains (branching length) is preferably from a length of $C_{10}$ chain to substantially the same as a length of the main chain, and the number of the branched chains (branching number) is 0.001 to 5 per 1,000 carbon atoms.

In order to adjust the branching length to the above-specified range, there may be used such a method of controlling amounts and kinds of the macromonomer and polyene used upon production of the graft copolymer as well as graft-copolymerization conditions.

The branching number may be adjusted by controlling the amounts of the macromonomer and polyene.

(ii) Definitions by Non-Newtonian Parameters

As the useful method for measuring a fine polyene unit content in the graft copolymer, there may be used a method of evaluating the content from an angular velocity dependency of a kinematic viscoelasticity of the graft copolymer. The measuring method is base on such a fact that the shear rate-dependency of melt viscosity of a polyolefin containing a branched structure due to the polyene unit even in a fine amount is different from that of a polyolefin containing no branched structure.

Namely, the shear rate dependency of melt viscosity of the polyolefin having such a branched structure due to the polyene unit is larger than that of the polyolefin containing no branched structure. Therefore, the polyene unit forming the branched structure can be detected by comparing the shear rate dependency of melt viscosity of the graft copolymer with that of the polymer produced under the same conditions as those of the graft copolymer except for using no polyene.

Further, it is known that the above method is influenced by the molecular weight distribution of the polymer to be measured. However, in this case, by comparing the shear rate dependency of melt viscosity of the graft copolymer relative to its molecular weight distribution with that of the polyolefin apparently having no branched structure and containing the same kind of constituting monomer unit at the substantially same content, the polyene unit forming the branched structure can be surely detected.

The specific measuring method is exemplified below.

Apparatus: Melt viscosity measuring device "RMS800" available from Rheometrics Inc.

Measuring Conditions:

Temperature: Melting point or glass transition temperature or higher of the graft copolymer There is usually used a temperature higher by 10 to 60° C. than the maximum melting point of the graft copolymer, or a temperature higher by 10 to 200° C. than the maximum glass transition temperature of the graft copolymer;

Deflection: 15%;

Angular velocity: 0.01 to 100 rad/sec.;

Shape of specimen: Cone plate shape;

Data Processing:

The value of $\omega_2/10\omega_1$ wherein $\omega_1$ represents an angular velocity at which a storage elastic modulus is 10 Pa; and $\omega_2$ represents an angular velocity at which a storage elastic modulus is $10^3$ Pa, is calculated.

<Detection of Polyene Unit>

Case 1:

The case where a polyolefin produced under the same conditions as those of the graft copolymer except for using no polyene, is used as a comparative specimen, and a ratio of a molecular weight distribution [weight-average molecular weight (Mw)/number-average molecular weight (Mn)] of the polyolefin to that of the graft copolymer produced using the polyene is in the range of 0.8:1 to 1.8:1:

When the following formula (a) wherein $N^1$ represents the value of $\omega_2/10\omega_1$ of the graft copolymer and $N^0$ represents the value of $\omega_2/10\omega_1$ of the comparative specimen is satisfied, it is determined that the polyene unit is present in the graft copolymer.

Case 2:

The case where the comparative specimen is made of a polyolefin apparently having no branched structure, and constituting monomer units of the polyolefin are the same in kind and substantially the same in composition ratio as those of the graft copolymer:

Here, the "constituting monomer units are substantially the same in composition ratio" means that the comparative specimen is made of either one of the following materials:

(1) Polyolefin having all of the same sequences as those of the graft copolymer except for sequences derived from the polyene unit; and a polymeric structure other than a grafting structure whose monomer composition is substantially the same as that of the graft copolymer; or (2) A mixture composed of different polyolefins each having all of the same sequences as those of the graft copolymer except for sequences derived from the polyene unit, and a polymeric structure other than a grafting structure whose monomer composition is substantially the same as that of the graft copolymer.

The comparative specimen is subjected to GPC to measure a molecular weight distribution [weight-average molecular weight (Mw)/number-average molecular weight (Mn)] thereof, and the value of $N^0$ ($\omega_2/10\omega_1$ value of the comparative specimen) is plotted relative to the thus measured molecular weight distribution to determine a monotone increasing function $N^0=f(Mw/Mn)$ by a method of least square.

The existence of the polyene unit in the graft copolymer can be confirmed when the relationship between the above-determined function ($N^0$) and $N^1$ obtained from the molecular weight distribution $(Mw/Mn)_1$ of the graft copolymer satisfies the following formula (a):

$$1.05 \leq N^1/N^0 \leq 80 \quad (a)$$

preferably $1.10 \leq N^1/N^0 \leq 80$
more preferably $1.30 \leq N^1/N^0 \leq 70$
still more preferably $1.50 \leq N^1/N^0 \leq 65$
further still more preferably $1.70 \leq N^1/N^0 \leq 60$
most preferably $2.00 \leq N^1/N^0 \leq 55$ When the ratio $N^1/N^0$ is less than 1.05, the graft copolymer tends to be deteriorated in compatibility, thereby failing to obtain a composition exhibiting sufficient physical properties. On the other hand, when the ratio $N^1/N^0$ exceeds 80, graft copolymers having a cross-linked structure are by-produced, resulting in formation of gels and, therefore, deteriorated physical properties and poor mixing ability upon production of the composition.

(iii) Branching Parameter ($\alpha$)

The branching parameter ($\alpha$) is determined as follows. That is, a specimen is subjected to GPC/MALLS (multi-angle light scattering) measurement to obtain $<R^2>^{1/2}$ (root mean square of radius) from a gradient of a scattered light intensity and a weight-average molecular weight M from an intercept of the scattered light intensity at the respective elution positions. A logarithm of the $<R^2>^{1/2}$ and M is plotted to calculate a gradient ($\alpha$) of the plotted curve by a method of least square.

The thus determined a values of the linear polymer and the graft copolymer preferably satisfy the following formula:

$$[(\alpha)^L/(\alpha)^B] \geq 1.02, \text{ and}$$

more preferably $$[(\alpha)^L/(\alpha)^B] \geq 1.04$$

wherein $(\alpha)^L$ is the $\alpha$ value of the linear polymer; and $(\alpha)^B$ is the $\alpha$ value of the graft copolymer.

The GPC/MALLS measurement of the specimen is performed, for example, under the following conditions:

Solvent: 1,2,4-trichlorobenzene
Concentration: 0.3% (w/v)
Dissolving temperature: 135° C.
Measuring apparatuses: "150-C" (GPC) available from Waters, Inc. "DOWN EOS™" (multi-angle light scattering) available from Wyatt Technology, Inc.
Column: "Shodex UT806MLT" (7.8 mmφ×50 cm) available from Showa Denko Co., Ltd.
Amount introduced: 300 µl
Flow rate: 1.0 ml/min
Increment of refractive index to concentration (dn/dc): −0.095

(3) Definitions of Polyene Unit-Containing Graft Copolymer

The graft copolymer (B)-1 preferably has a 140° C. xylene-insoluble content of 0 to 1.5% by mass. When the 140° C. xylene-insoluble content exceeds 1.5% by mass, the graft copolymer tends to be insufficient in melt-dispersibility and solution-dispersibility upon production of the composition, thereby failing to obtain the composition having the aimed properties, and further a molded article produced therefrom tends to show a poor appearance and suffer from deterioration in breaking strength due to concentrated stress. Therefore, the 140° C. xylene-insoluble content of the graft copolymer (B)-1 is preferably 0 to 1.3% by mass, more preferably 0 to 1.2% by mass, still more preferably 0 to 1.0% by mass, further still more preferably 0 to 0.5% by mass and most preferably 0 to 0.3% by mass.

The above xylene-insoluble content is measured by the following method. That is, 2.0 g of the graft copolymer is placed in a 150 mesh stainless steel container, immersed in one liter of p-xylene at 140° C. and dissolved therein while stirring for 5 hours. After completion of the dissolution, the container is lifted up from the p-xylene, and the residues of the container are dried at 100° C. under reduced pressure while being kept in the container until reaching a constant weight. The weight of the graft copolymer remaining in the container is divided by the weight of the graft copolymer initially charged to determine a xylene-insoluble content (%) in the graft copolymer.

In addition, the polyene unit content in the graft copolymer (B)-1 is usually in the range of preferably 0 to 0.45 mol %, more preferably 0 to 0.40 mol %, still more preferably 0 to 0.35 mol %, further still more preferably 0 to 0.30 mol %, further still more preferably 0 to 0.25 mol % and most preferably 0 to 0.20 mol %. When the polyene unit content exceeds 0.45 mol %, there tends to occur the same problem as described in the case where the xylene-insoluble content exceeds 1.5% by mass. Meanwhile, the polyene unit content may be measured by the above-mentioned method.

Further, it is required that the graft copolymer (B)-1 contains residual carbon-to-carbon double bonds derived from the polyene unit in an amount of 0 to 0.15 mol %. Meanwhile, the residual unsaturated bonds defined herein mean those derived from the polyene unit, and do not involve carbon-to-carbon double bonds present at ends of polymers which are newly produced during the production process. When the amount of the residual carbon-to-carbon double bonds exceeds 0.15 mol %, the obtained composition tends to be deteriorated in weather resistance and thermal stability. The amount of the residual carbon-to-carbon double bonds contained in the graft copolymer is preferably in the range of 0 to 0.13 mol %, more preferably 0 to 0.11 mol %, still more preferably 0 to 0.09 mol %, further still more preferably 0 to 0.07 mol % and most preferably 0 to 0.05 mol %.

Meanwhile, the amount of the residual carbon-to-carbon double bonds derived from the polyene unit can be measured according to ordinary methods such as infrared absorption spectrum method and ultraviolet absorption spectrum method.

(4) Preferred Copolymer (B)-1

(i) Propylene Moieties

Propylene moieties of the copolymer (B)-1 are composed of propylene homopolymer chains, or propylene copolymer chains constituted from at least one monomer selected from the group consisting of ethylene and $C_4$ to $C_{20}$ α-olefins. The propylene moieties are preferably identical in kinds of constituting monomers and similar in the monomer composition to those of the propylene moieties of the propylene (co)polymer as the component (A). Namely, the ratio of a to b (a/b) wherein a is a composition ratio of total comonomers to propylene (mol/mol) in the propylene (co)polymer (A); and b is a composition ratio of total comonomers to propylene (mol/mol) in the propylene moieties of the copolymer (B)-1, is in the range of preferably 0.3 to 2.5 and more preferably 0.5 to 2.0.

Also, the propylene moieties preferably have such a stereoregularity that the meso-pentad fraction [mmmm] thereof is 40 to 99.9%. Further, the stereoregularity is preferably similar to that of the propylene (co)polymer (A). Therefore, the meso-pentad fraction [mmmm] of the propylene moieties is more preferably 60 to 99.9%, still more preferably 65 to 99.9%, further still more preferably 70 to 99.9% and most preferably 75 to 99.9%. When the meso-pentad fraction is less than 40%, the obtained composition tends to be deteriorated in physical properties, especially impact strength. Meanwhile, the meso-pentad fraction can be measured by the same method as used for that of the component (A).

(ii) Copolymerization Moieties

Copolymerization moieties of the copolymer (B)-1 are constituted from at least two monomers selected from the group consisting of ethylene, $C_3$ to $C_{20}$ α-olefins, cyclic olefins and aromatic vinyl monomers. In the present invention, the copolymerization moieties are preferably propylene copolymer chains composed of propylene and at least one monomer selected from the group consisting of ethylene and $C_4$ to $C_{20}$ α-olefins, more preferably copolymer chains composed of the same monomers as those of the ordinary temperature (25° C.) xylene-soluble component in the propylene (co)polymer (A), and most preferably copolymer chains composed of propylene and ethylene.

The composition of the copolymerization moieties preferably lies in such a range that the ratio of a to c (a/c) wherein a is a composition ratio of total comonomers to propylene (mol/mol) in the ordinary temperature (25° C.) xylene-soluble component in the propylene (co)polymer (A); and c is a composition ratio of total comonomers to propylene (mol/mol) in the copolymerization moieties of the copolymer (B)-1, is in the range of preferably 0.3 to 2.5 and more preferably 0.5 to 2.0. The content of the polypropylene moieties in the copolymer (B)-1 is preferably 1 to 99% by mass and more preferably 40 to 98% by mass.

(iii) Molecular Weight of Copolymer (B)-1

The intrinsic viscosity [η] of the copolymer (B)-1 as measured at 135° C. in decalin which is an index of a molecular weight thereof, is preferably 0.05 to 10 dl/g, more preferably 0.05 to 8 dl/g, still more preferably 0.06 to 7 dl/g and most preferably 0.1 to 6 dl/g. When the intrinsic viscosity [η] of the copolymer (B)-1 is less than 0.05 dl/g, the obtained composition tends to be deteriorated in physical properties, especially impact strength. When the intrinsic viscosity [η] exceeds 10 dl/g, the copolymer (B)-1 tends to be deteriorated in melt-dispersibility upon production of the composition.

[2] Copolymer (B)-2 having Block Bonds (1) Copolymer Structure

The copolymer (B)-2 is a true block copolymer having a chemical bonding site produced by block polymerization method. The true block copolymer may be produced, for example, by polymerizing propylene in the presence of a so-called Ziegler-Natta catalyst while the catalyst is kept in an activated polymerizable state, and successively copolymerizing propylene with at least one monomer selected from the group consisting of ethylene, $C_4$ to $C_{20}$ α-olefins, cyclic olefins and aromatic vinyl monomers.

(2) Definitions of Block Structure (i) Copolymer having Block Bonding Sites which are Recognizable by Spectroscopic Method:

The block bonding sites of the copolymer can be detected by a method of directly detecting the chemical bonding sites themselves, for example, by an ordinary nuclear magnetic resonance spectrum method. Since the block bonding sites usually contain secondary carbon atoms, it is possible to detect these peculiar bonds.

(ii) Copolymer having a Block Structure which is Recognizable Based on Difference in Solubility Between Polymer Chains:

The block structure of the copolymer is detected on the basis of the difference in solubility between the polymer chains. The copolymer is dissolved in a solvent to which one of the polymer chains has a higher solubility, or in a mixed solvent prepared by mixing a plurality of solvents which is controlled in its solubility, in order to determine that a soluble component is present in the solvent-insoluble component, or a solvent-insoluble component is present in the soluble component. Alternatively, the method described in the above (i) is applied to the thus separated components to detect the block bonding sites therein.

(3) Preferred Copolymer (B)-2

(i) Propylene Moieties

The propylene moieties of the copolymer (B)-2 are the same as those of the above copolymer (B)-1.

(ii) Copolymerization Moieties

The copolymerization moieties of the copolymer (B)-2 are also the same as those of the above copolymer (B)-1. However, when the propylene moieties are composed of copolymer chains, the copolymerization moieties contain the same kinds of monomers as those of the propylene moieties.

(iii) Molecular Weight of Copolymer

The molecular weight of the copolymer (B)-2 is the same as that of the above copolymer (B)-1.

[3] Copolymer (B)-3 having Graft and Block Bonds (1) Copolymer Structure

The copolymer (B)-3 involves graft/block copolymers having graft copolymerization sites produced by polymerization reaction via macro-monomer as well as block bonding sites due to true block bonds, graft/block copolymers having graft copolymerization sites based on polyene as well as block bonding sites due to true block bonds, or graft/block copolymers having graft copolymerization sites induced from both macro-monomer and polyene as well as block bonding sites due to true block bonds.

(2) Parameters of Graft/Block Structure

The parameters of the graft/block structure are the same as those of the copolymer (B)-1, and a preferred ranges thereof are also the same as those described in the copolymer (B)-1.

[4] Preferred Copolymer (B)

(1) Definitions by Solid $^1$H-NMR Measurement

In the graft copolymer, block copolymer or graft/block copolymer, a ratio of a relaxation velocity $(1/R_1)$ of a long-term relaxation component thereof as measured by solid $^1$H-NMR method, to a relaxation velocity $(1/R_1)_0$ of a long-term relaxation component of a composition in the form of merely a physical mixture composed of polymer chains constituting the graft copolymer, block copolymer or graft/block copolymer as measured by solid $^1$H-NMR method (i.e., ratio of $[(1/R_1)/(1/R_1)_0]$), is preferably 1.05 or higher. When the ratio $[(1/R_1)/(1/R_1)_0]$ is less than 1.05, the copolymer tends to be deteriorated in compatibility with resins, thereby failing to obtain the composition having the aimed properties. The ratio $[(1/R_1)/(1/R_1)_0]$ is preferably 1.06 or higher and more preferably 1.07 or higher.

Meanwhile, the above relaxation velocities $(1/R_1)$ and $(1/R_1)_0$ are measured by an inverted restoration method (180°-τ-90° pulse method) using the following solid $^1$H-NMR measuring apparatus.

Apparatus: "CPX-902 available from Bluker Inc.
Nucleus to be measured: Hydrogen nucleus ($^1$H)
Measuring frequency: 90 MHz
Measuring temperature: The relaxation velocities of the respective long-term relaxation components are usually measured in a temperature of from 0° C. to 150° C., preferably in such a temperature range in which the difference between the relaxation velocities becomes largest.
90° pulse width: 2.4 to 2.5 μsec (2) Preferred Copolymer The copolymer (B) is not limited particular ones as long as it can satisfy the above parameters. In the present invention, of these copolymers, especially preferred are the copolymer (B)-1 and the copolymer (B)-3, since the copolymer (B)-1 and the copolymer (B)-3 can be more broadly controlled and selected in number and kind of branched chains thereof for forming a molecular structure having an enhanced compatibility, as compared to the copolymer (B)-2.

The copolymer (B) may also contain various additives such as neutralizing agents, antioxidants, weather-resisting agents and antistatic agents similarly to the propylene (co) polymer (A). In the present invention, the ratio between amounts of the propylene (co)polymer (A) and the copolymer (B) used may be controlled such that the copolymer (B) is used in an amount of 0.1 to 20% by mass based on 99.9 to 80% by mass of the propylene (co)polymer (A). The amount of the propylene (co)polymer (A) used is preferably 99.8 to 81% by mass and more preferably 99.7 to 82% by mass, and the amount of the copolymer (B) used is preferably 0.2 to 19% by mass and more preferably 0.3 to 18% by mass.

The methods for producing the polyolefin-based resin compositions (I) and (II) according to the present invention are not particularly restricted. The polyolefin-based resin compositions (I) and (II) may be produced by a method of mixing separately preapred pellets of the propylene (co) polymer (A) and the copolymer (B) and then supplying the mixed pellets to a molding machine, or a method of melt-mixing the propylene (co)polymer (A) with the copolymer (B) and then pelletizing the resultant molten mixture. In order to exhibit the effects of the present invention at maximum, the method of previously melt-mixing the propylene (co)polymer (A) with the copolymer (B) is preferable. The melt-mixing is preferably performed using a multi-screw extruder having two or more screws. The rotational directions of the screws of the extruder may be identical to or different from each other. Further, upon the melt-mixing, additives such as antioxidants may be added to the molten mixture.

The method of supplying the respective components upon the melt-mixing is not particularly restricted. The respective components may be previously mixed together by Henschel mixer, V-type blender, tumbler blender, ribbon blender, etc., and then supplied to the extruder, or may be directly supplied to the extruder using a feeder.

The propylene (co)polymer as the component (A) of the polyolefin-based resin composition (III) according to the present invention can satisfy (a) a melt flow rate (MFR) of 0.1 to 200 g/10 min, and (b) a content of an ordinary temperature (25° C.) xylene-soluble component of 4 to 50% by mass.

The method for producing the propylene (co)polymer (A) used in the polyolefin-based resin composition (III) of the present invention is not particularly restricted as long as polymers or copolymers produced by the method can satisfy the above requirement (a) and (b). In view of good balance between production costs and properties of the obtained product, the propylene (co)polymer (A) is preferably in the form of a propylene homopolymer, or a so-called propylene block copolymer produced by first polymerizing propylene with a small amount of other olefin at a front stage and then further copolymerizing propylene with a substantial amount of the other olefin at a rear stage. In general, the propylene (co)polymer (A) can be produced in the presence of a so-called Ziegler-Natta catalyst containing as essential components, a transition metal compound containing a transition metal of Groups 4 to 6 of the Periodic Table and an organometallic compound containing a metal element of Groups 1 to 3 and 11 to 13 of the Periodic Table as described in Japanese Patent Application Laid-open Nos. Sho 58-138715, Sho 61-209207, Sho 62-104810, Sho 62-104811, Sho 62-104812, Sho 62-104813, Hei 1-311106, Hei 1-318011 and Hei 2-84404. The melt flow rate (a) may be controlled mainly by adjusting the amount of a chain transfer agent such as hydrogen used upon the polymerization. Further, in the case of the propylene homopolymer, the content (b) of an ordinary temperature (25° C.) xylene-soluble component may be controlled mainly by selecting the kind of the above Ziegler-Natta catalyst. Also, in the case of the copolymer with the other olefin, the content (b) of an ordinary temperature (25° C.) xylene-soluble component may be controlled mainly by adjusting the amount of the comonomer or the amount of copolymerization moieties.

In the polyolefin-based resin composition (III), the propylene (co)polymer (A) may be used singly or in combination of any two or more kinds thereof.

When the MFR of the propylene (co)polymer (A) is less than 0.1 g/10 min, the obtained composition tends to be considerably difficult to mold. When the MFR of the propylene (co)polymer (A) exceeds 200 g/10 min, the obtained composition tends to be insufficient in mechanical properties. In order to exhibit the effects of the present invention at maximum, the MFR of the propylene (co)polymer (A) is preferably 10 to 200 g/10 min and more preferably 10 to 100 g/10 min. The MFR is the value measured at 230° C. under a load of 21.18 N according to JIS K7210.

The meso-pentad fraction [mmmm] of an ordinary temperature (25° C.) xylene-insoluble component in the component (A) is not particularly restricted. In order to attain a higher balance between physical properties of the obtained composition, the meso-pentad fraction [mmmm] of an ordinary temperature (25° C.) xylene-insoluble component in the component (A) is preferably 94.0% or higher and more preferably 97.0% or higher.

On the other hand, when the content of an ordinary temperature (25° C.) xylene-soluble component in the component (A) is less than 4% by mass, the obtained composition tends to be insufficient in impact strength. When the content of an ordinary temperature (25° C.) xylene-soluble component in the component (A) exceeds 50% by mass, the obtained composition tends to be deteriorated in rigidity. If the resin composition is used in the fields of transportation materials, automobile interior trims and domestic appliances, the content of an ordinary temperature (25° C.) xylene-soluble component in the component (A) is suitably in the range of 4 to 25% by mass in view of a good balance between rigidity and impact strength of the obtained composition. If the resin composition is used in the field of automobile exterior trims such as bumpers requiring a high impact strength, the content of an ordinary temperature (25° C.) xylene-soluble component in the component (A) is suitably in the range of 10 to 50% by mass.

As to the polyolefin-based resin composition (III), since the methods for attaining the ordinary (25° C.) xylene-soluble and xylene-insoluble components, the method of measuring the meso-pentad fraction as well as details of the component (B) are similar to those described above in the polyolefin-based resin compositions (I) and (II), the detailed explanations therefor are omitted herein.

The ratio between amounts of the propylene (co)polymer (A) and the copolymer (B) used in the polyolefin-based resin composition (III) may be controlled such that the copolymer (B) is present in an amount of 0.1 to 20% by mass based on 99.9 to 80% by mass of the propylene (co)polymer (A). The amount of the propylene (co)polymer (A) used is preferably 99.8 to 81% by mass and more preferably 99.7 to 82% by mass, and the amount of the copolymer (B) used is preferably 0.2 to 19% by mass and more preferably 0.3 to 18% by mass.

Examples of the inorganic filler (C) used in the polyolefin-based resin composition (III) include fibrous inorganic fillers such as glass fibers, carbon fibers and alumina fibers, and granular or powdery inorganic fillers such as talc, carbon black, graphite, titanium dioxide, silica, mica, wollastonite, calcium carbonate, calcium sulfate, barium carbonate, magnesium carbonate, magnesium sulfate, barium sulfate, oxysulfate, tin oxide, alumina, kaolin, silicon carbide and metal powders. In the present invention, of these inorganic fillers, preferred are talc, mica and wollastonite, and more preferred is talc. The inorganic fillers suitably have an average particle size of 10 μm or lower and an aspect ratio of 2 or higher in view of rigidity and impact resistance of the obtained composition. The amount of the inorganic fillers added is 3 to 40 parts by mass and preferably 5 to 30 parts by mass based on 100 parts by mass of a total amount of the propylene (co)polymer (A) and the copolymer (B). When the amount of the inorganic fillers added is less than 3 parts by mass, the obtained composition tends to be insufficient in properties such as rigidity. When the amount of the inorganic fillers added exceeds 40 parts by mass, the specific gravity of the obtained composition tends to become too large, thereby failing to reduce the weight thereof as the aimed object of the present invention.

The method for producing the polyolefin-based resin composition (III) according to the present invention is not particularly restricted. The polyolefin-based resin composition (III) can be produced by a method of mixing separately prepared pellets of the propylene (co)polymer (A) and the copolymer (B) with each other and then supplying the mixed pellets together with the inorganic filler (C) to a molding machine, or a method of melt-mixing the propylene (co)polymer (A), the copolymer (B) and the inorganic filler (C) with each other, and then pelletizing the molten mixture. Of these methods, in order to exhibit the effects of the present invention at maximum, the method of previously the propylene (co)polymer (A), the copolymer (B) and the inorganic filler (C) with each other is preferable. The melt-mixing is preferably performed using a multi-screw extruder having two or more screws. The rotational directions of the screws of the extruder may be identical to or different from each other. Further, upon the melt-mixing, additives such as antioxidants may be added to the molten mixture.

The method of supplying the respective components upon the melt-mixing is not particularly restricted. The respective components may be previously mixed together by Henschel mixer, V-type blender, tumbler blender, ribbon blender, etc., and then supplied to the extruder, or may be directly supplied to the extruder using a feeder.

The polyolefin-based resin composition (III) of the present invention may contain, if required, various additives such as antioxidants, heat stabilizers, weather stabilizers, antistatic agents, lubricants, nucleating agents, colorants and flame retardants unless the addition thereof adversely affects the aimed objects of the present invention.

The propylene (co)polymer as the component (A) of the polyolefin-based resin composition (IV) according to the present invention satisfies (a) a melt flow rate (MFR) of 0.1 to 200 g/10 min, and (b) a meso-pentad fraction [mmmm] of an ordinary temperature (25° C.) xylene-insoluble component of 94.0% or higher.

The method for producing the propylene (co)polymer (A) used in the polyolefin-based resin composition (IV) according to the present invention is not particularly restricted as long as the obtained (co)polymers can satisfy the above requirement (a) and (b). In general, the propylene (co) polymer (A) can be produced in the presence of a so-called Ziegler-Natta catalyst containing as essential components, a transition metal compound containing a transition metal of Groups 4 to 6 of the Periodic Table and an organometallic compound containing a metal element of Groups 1 to 3 and 11 to 13 of the Periodic Table as described in Japanese Patent Application Laid-open Nos. Sho 58-138715, Sho 61-209207, Sho 62-104811, Sho 62-104812, Sho 62-104813, Hei 1-311106, Hei 1-318011 and Hei 2-84404. The melt flow rate (a) may be controlled mainly by adjusting the amount of a chain transfer agent such as hydrogen used upon the polymerization. The meso-pentad fraction of an ordinary temperature (25° C.) xylene-insoluble component may be controlled mainly by selecting the kind of the above Ziegler-Natta catalyst. Further, in the case of the propylene homopolymer, the content of an ordinary temperature (25° C.) xylene-soluble component (c) may be controlled mainly by selecting the kind of the above catalyst similarly to the above (b). Also, in the case of the copolymer with other olefin, the content (c) may be controlled mainly by adjusting the amount of the comonomer or the amount of the copolymerization moieties.

In the polyolefin-based resin composition (IV), the propylene (co)polymer (A) may be used singly or in combination of any two or more kinds thereof. The propylene (co)polymer (A) may contain, if required, various additives such as neutralizing agents, antioxidants, weather-resisting agents and antistatic agents unless the addition of these additives adversely affects the effects of the present invention.

When the MFR of the propylene (co)polymer (A) is less than 0.1 g/10 min, the obtained composition tends to be considerably difficult to mold. When the MFR of the propylene (co)polymer (A) exceeds 200 g/10 min, the obtained composition tends to be insufficient in mechanical properties.

In order to exhibit the effects of the present invention at maximum, the MFR of the propylene (co)polymer (A) is preferably 10 to 200 g/10 min and more preferably 10 to 100 g/10 min. The MFR is the value measured at 230° C. under a load of 21.18 N according to JIS K7210.

The meso-pentad fraction [mmmm] of an ordinary temperature (25° C.) xylene-insoluble component in the component (A) is required to be high enough to allow the obtained composition to show a sufficient rigidity. When the meso-pentad fraction is less than 94.0%, the finally obtained polyolefin-based resin composition tends to be considerably deteriorated in rigidity. Therefore, the meso-pentad fraction [mmmm] of an ordinary temperature (25° C.) xylene-insoluble component in the component (A) is essentially 94.0% or higher and preferably 97.0% or higher.

In the polyolefin-based resin composition (IV), since the methods for attaining the ordinary (25° C.) xylene-soluble and xylene-insoluble components, the method of measuring the meso-pentad fraction as well as details of the component (B) are similar to those described above in the polyolefin-based resin compositions (I) and (II), the detailed explanations therefor are omitted herein.

Examples of the inorganic filler used as the component (C) in the polyolefin-based resin composition (IV) include talc, mica, wollastonite or the like. Of these inorganic fillers, preferred is talc. The talc preferably has an average particle size of 10 μm or lower and an aspect ratio of 2 or higher from the standpoints of rigidity, impact strength, etc. of the obtained polyolefin-based resin composition (IV).

The amount of the inorganic filler added is 0 to 30 parts by mass based on 100 parts by mass of a total amount of the component (A), the inorganic filler (C) and the component (D). When the amount of the inorganic filler added exceeds 30 parts by mass, the specific gravity of the obtained polyolefin-based resin composition tends to become too large, thereby failing to reduce the weight thereof as the aimed object of the present invention.

Examples of the rubber component used as the component (D) in the polyolefin-based resin composition (IV) include ethylene-$C_3$ or higher α-olefin copolymer elastomers such as ethylene-propylene copolymer elastomers, ethylene-butene copolymer elastomers and ethylene-octene copolymer elastomers; hydrogenated styrene-diene copolymer elastomers such as hydrogenated styrene-butadiene copolymer elastomers and hydrogenated styrene-isoprene copolymer elastomers; hydrogenated diene (co)polymer elastomers such as hydrogenated 1,2-butadiene/1,4-butadiene copolymer elastomers and hydrogenated butadiene/isoprene copolymer elastomers; or the like.

These rubber components may be used singly or in combination of any two or more kinds thereof. Of these rubber components, the elastomers containing styrene in an amount of about 1 to 20% by mass are especially preferred in view of their properties.

The amount of the rubber component (D) added is 5 to 30 parts by mass and preferably 15 to 25 parts by mass based on 100 parts by mass of a total amount of the component (A), the inorganic filler (C) and the rubber component (D). When the amount of the rubber component (D) added is less than 5 parts by mass, the obtained polyolefin-based resin composition tends to be insufficient in impact strength and, therefore, become unpractical. When the amount of the rubber component (D) added exceeds 30 parts by mass, the obtained polyolefin-based resin composition tends to be deteriorated in rigidity, thereby failing to achieve reduction in thickness and weight thereof.

The method for producing the polyolefin-based resin composition (IV) according to the present invention is not particularly restricted. The polyolefin-based resin composition (IV) can be produced by a method of dry-blending the propylene (co)polymer (A), the copolymer (B), the inorganic filler (C) and the rubber component (D) with each other using a mixer or a blender, and then supplying the resultant mixture to a molding machine, or a method of previously melt-mixing these components with each other, pelletizing the molten mixture, and then supplying the obtained pellets to a molding machine. Of these methods, in order to exhibit the effects of the present invention at maximum, the method of previously sufficiently melt-mixing the propylene (co)polymer (A), the copolymer (B), the inorganic filler (C) and the rubber component (D) with each other is preferable.

The melt-mixing is preferably performed using a multi-screw extruder having two or more screws. The rotational directions of the screws of the extruder may be identical to or different from each other. The method of supplying the respective components upon the melt-mixing is not particularly restricted. The respective components may be previously mixed together by Henschel mixer, V-type blender, tumbler blender, ribbon blender, etc., and then supplied to the extruder, or may be directly supplied to the extruder using a feeder.

Also, the polyolefin-based resin composition (IV) may contain, if required, various additives such as heat stabilizers, weather stabilizers, antistatic agents, lubricants, nucleating agents, colorants and flame retardants, as well as reinforcing materials or fillers other than talc such as glass fibers and calcium carbonate.

Next, the present invention will be described in more detail by reference to the following examples and comparative examples, but it should noted that these examples are not intended to limit the invention thereto.

EXAMPLE 1

[1] Preparation of Catalyst Component (1) Preparation of Aluminum Oxy Compound

One thousand milliliters of a toluene solution of methyl aluminoxane (1.47 mol/liter; available from Albemarle Corporation; containing 14.5% by mass of trimethyl aluminum) was distilled at 60° C. under reduced pressure (about 20 mmHg) to remove the toluene solvent and liberated methyl aluminum therefrom. Then, dehydrated toluene was added to the dried-up methyl aluminoxane to dissolve the latter again and obtain a toluene solution thereof having the same volume as that before distilling off the solvent. As a result of $^1$H-NMR measurement of the resultant solution, it was confirmed that the amount of trimethyl aluminum contained in the methyl aluminoxane was 3.6% by mass. Also, as a result of the measurement by fluorescent X-ray (ICP) method, it was confirmed that the total amount of aluminum contained in the methyl aluminoxane was 1.32 mol/liter. Thereafter, the obtained solution was allowed to stand for 48 hours to precipitate insoluble components thereof, and then filtered through a G5 glass filter to separate a solution portion from the precipitate, thereby obtaining toluene-soluble methyl aluminoxane. As a result of the measurement by IPC method, it was confirmed that the concentration of the toluene-soluble methyl aluminoxane was 1.06 mol/liter.

(2) Preparation of Carrier and Preparation of Carrier-Supported Methyl Aluminoxane Seventy grams of $SiO_2$ ("P-10" available from Fuji Silicia Co., Ltd.) was dried at 140° C. for 15 hours under a trace nitrogen flow. Then, 22.0 g of the thus dried $SiO_2$ was weighed and added to 200 ml of dehydrated toluene. After the resultant mixture was cooled to a constant temperature of 0° C. while stirring under a nitrogen atmosphere, 200 ml of the toluene solution of methyl aluminoxane prepared in the above step (1) was dropped thereinto for 60 minutes. After completion of the dropping, the resultant solution was heated to room temperature at which the solution was reacted for 30 minutes, and further heated to 70° C. at which the solution was reacted for 3 hours. After completion of the reaction, the obtained reaction mixture was held at 60° C., and the solid component thereof was washed with 200 ml of dehydrated toluene twice and then with 200 ml of dehydrated heptane twice. The obtained solids were dried at 50° C. under reduced pressure to obtain 32.8 g of $SiO_2$-supported methyl aluminoxane. The thus obtained $SiO_2$-supported methyl aluminoxane was charged again into dehydrated heptane and preserved in the form of a slurry.

(3) Preparation of Carrier-Supported Metallocene Catalyst

A 100 ml Schlenk tube was dried and purged with nitrogen, and then charged with 50 ml of dried heptane and 10 mmol (in terms of aluminum atom) of the $SiO_2$-supported methyl aluminoxane prepared in the above step (2), followed by initiation of stirring. One milliliter of a toluene solution containing racemic dimethylsilylenebis(2-methyl-4-phenyl-indenyl)zirconium dichloride [rac-SiMe$_2$(2-Me-4-Ph-Ind)$_2$ZrCl$_2$] in an amount of 10 μmol in terms of zirconium atom, was slowly added to the $SiO_2$-supported methyl aluminoxane, and reacted for 10 minutes.

[2] Production of Graft Polymer [Copolymer (B)]

A 5 liter stainless steel pressure-tight autoclave was charged with 2 liters of dehydrated heptane and 2.5 mmol of triisobutyl aluminum, and the mixture was stirred at room temperature for 10 minutes. Then, a whole amount of the supported catalyst prepared in the above step (3) was added to the autoclave.

The above catalyst was used to prepolymerize propylene at 25° C. under a propylene pressure of 0.3 MPa (gauge pressure) for 30 minutes to activate the catalyst, and then the reaction mixture was subjected to depressurization and blowing with nitrogen to remove unreacted propylene therefrom. Then, 4.0 ml of a heptane solution containing 2.5 mmol of 1,9-decadiene was added to the obtained reaction solution, and then hydrogen was introduced thereinto until reaching 0.02 MPa (gauge pressure). After setting the reaction temperature at 60° C. and introducing propylene until reaching a propylene partial pressure of 0.7 MPa (gauge pressure), the polymerization reaction was initiated and continued for 30 minutes while controlling the reaction temperature to obtain a propylene copolymer.

After completion of the reaction, the resultant reaction solution was cooled to room temperature and depressurized, and after termination of stirring, the liquid phase thereof was separated therefrom. Further, the obtained solid reaction product was washed with a heptane solution of triisobutyl aluminum (1.25 mol/liter) three times by decantation method, and then a suitable amount of the heptane solution of triisobutyl aluminum (1.25 mol/liter) was added thereto to adjust a total volume of the solution to 2 liters.

Then, while controlling the reaction temperature to 35° C., propylene and ethylene were supplied at feed rates of 9 normal liters/min and 1.5 normal liters/min, respectively, to adjust a whole pressure to 0.7 MPa (gauge pressure), thereby conducting the graft polymerization for 30 minutes. After completion of the polymerization, the reaction mixture was depressurized, filtered and then dried to recover 712 g of a graft polymer. As a result, it was confirmed that the thus obtained graft polymer had a meso-pentad fraction of propylene chains of 95.0% and an intrinsic viscosity [η] of 2.15 dl/g, and the yield of the propylene polymer at the first stage was 78% by mass.

[3] Evaluation of Branched Structure of Graft Polymer (1) Preparation of Comparative Specimen (Linear Polymer)

The same procedure as in the above step [2] was repeated except for using no 1,9-decadiene, to obtain a comparative specimen.

(2) Method for Measurement of Branched Structure

The branched structure was measured by the method and under the conditions described in the paragraph "(iii) Branching Parameter ($\alpha$)" in the present specification.

(3) Evaluation of Branched Structure

The branched structure of the above obtained comparative specimen was measured by the method described in the above (2) to calculate the branching parameter ($\alpha$) thereof as $(\alpha)^L$, and the branched structure of the graft polymer was similarly measured to calculate the branching parameter ($\alpha$) thereof as $(\alpha)^B$. As a result, it was confirmed that the ratio $[(\alpha)^L/(\alpha)^B]$ was 1.09, i.e., exceeded 1 which indicated that the obtained polymer was a graft polymer.

[4] Production of Propylene-Ethylene Block Copolymer [Propylene (co)Polymer (A)]

Propylene and ethylene were batch-polymerized in a heptane solvent in the presence of a catalyst composed of the solid titanium catalyst component (prepolymerized product) as described in EXAMPLE 1 of Japanese Patent Application Laid-open No. Hei 2-84404, an organoaluminum compound (triethyl aluminum) and a silicon compound (dicyclopentyldimethoxysilane) using hydrogen as a chain transfer agent to produce a propylene-ethylene block copolymer.

It was confirmed that the thus obtained propylene-ethylene block copolymer had a MFR of 10.5 g/10 min, a meso-pentad fraction of an ordinary temperature (25° C.) xylene-insoluble component of 97.4% and a content of an ordinary temperature (25° C.) xylene-soluble component of 12% by mass.

[5] Production of Polyolefin-Based Resin Composition 9.5 kg of the propylene-ethylene block copolymer obtained in the above step [4], 0.5 kg of the graft polymer obtained in the above step [2], 15 g of a phenol-based antioxidant "IRGANOX 1010" available from Ciba Specialty Chemicals Corp., and 7.5 g of an antioxidant "P-EPQ" available from Asahi Denka Kogyo Co., Ltd., were intimately premixed together and kneaded using a twin-screw extruder "TEX-30" (available from Nippon Seikosho Co., Ltd.) having a screw diameter of 32 mm at a cylinder set temperature of 200° C. at a screw-rotating speed of 300 rpm and an extrusion output of 10 kg/30 min to produce pellets of a polyolefin-based resin composition.

The physical properties of the thus obtained composition were measured by the following methods. The results are shown in Table 1.

(1) Flexural Modulus

An injection-molded test specimen was prepared to measure a flexural modulus thereof according to JIS K7202.

(2) Impact Strength

An injection-molded test specimen was prepared to measure a notched Izod impact strength thereof at 23° C. and −20° C. according to JIS K7110.

(3) Tensile Elongation

An injection-molded test specimen was prepared to measure a tensile elongation thereof according to JIS K7113.

EXAMPLE 2

[1] Production of Propylene-Ethylene Block Copolymer [Propylene (co)Polymer (A)]

The same procedure as in [4] of EXAMPLE 1 was repeated except for varying the amount of hydrogen used as a chain transfer agent, to produce a propylene-ethylene block copolymer having the following properties.

It was confirmed that the thus obtained propylene-ethylene block copolymer had a MFR of 19.9 g/10 min, a meso-pentad fraction of an ordinary temperature (25° C.) xylene-insoluble component of 98.1% and a content of an ordinary temperature (25° C.) xylene-soluble component of 10.1% by mass.

[2] Production of Polyolefin-Based Resin Composition

The same procedure as in EXAMPLE 1 was repeated except for using, as a copolymer (A), 9.5 kg of the propylene-ethylene block copolymer obtained in the above step [1] to produce pellets of a polyolefin-based resin composition. The physical properties of the obtained polyolefin-based resin composition were measured by the same methods as used in EXAMPLE 1. The results are shown in Table 1.

EXAMPLE 3

[1] Production of Propylene-Ethylene Block Copolymer [Propylene (co)Polymer (A)]

The same procedure as in [4] of EXAMPLE 1 was repeated except for varying the amount of the copolymerization moieties, to produce a propylene-ethylene block copolymer having the following properties.

It was confirmed that the thus obtained propylene-ethylene block copolymer had a MFR of 11.6 g/10 min, a meso-pentad fraction of an ordinary temperature (25° C.) xylene-insoluble component of 97.2% and a content of an ordinary temperature (25° C.) xylene-soluble component of 16.6% by mass.

[2] Production of Polyolefin-Based Resin Composition

The same procedure as in EXAMPLE 1 was repeated except for using, as a copolymer (A), 9.5 kg of the propylene-ethylene block copolymer obtained in the above step [1], to produce pellets of a polyolefin-based resin composition. The physical properties of the obtained polyolefin-based resin composition were measured by the same methods as used in EXAMPLE 1. The results are shown in Table 1.

EXAMPLE 4

[1] Production of Propylene-Ethylene Block Copolymer [Propylene (co)Polymer (A)]

The same procedure as in [4] of EXAMPLE 1 was repeated except for varying the amount of hydrogen added as well as the amount of the copolymerization moieties, to produce a propylene-ethylene block copolymer having the following properties.

It was confirmed that the thus obtained propylene-ethylene block copolymer had a MFR of 110.0 g/10 min, a meso-pentad fraction of an ordinary temperature (25° C.)

xylene-insoluble component of 97.5% and a content of an ordinary temperature (25° C.) xylene-soluble component of 6.4% by mass.

[2] Production of Polyolefin-Based Resin Composition 8.5 kg of the propylene-ethylene block copolymer as a copolymer (A) obtained in the above step [1], 1.5 kg of the graft polymer obtained in the step [2] of EXAMPLE 1, 15 g of a phenol-based antioxidant "IRGANOX 1010" available from Ciba Specialty Chemicals Corp., and 7.5 g of an antioxidant "P-EPQ" available from Asahi Denka Kogyo Co., Ltd., were intimately premixed together and kneaded using a twin-screw extruder "TEX-30" (available from Nippon Seikosho Co., Ltd.) having a screw diameter of 32 mm under the same conditions as used in EXAMPLE 1, to produce pellets of a polyolefin-based resin composition. The physical properties of the thus obtained composition were measured by the same method as used in EXAMPLE 1. The results are shown in Table 1.

COMPARATIVE EXAMPLE 1

The same kneading procedure as in EXAMPLE 1 was repeated except for adding no copolymer (B) to produce pellets. The physical properties of the thus obtained composition were measured by the same methods as described above. The results are shown in Table 1.

COMPARATIVE EXAMPLE 2

The same kneading procedure as in EXAMPLE 2 was repeated except for adding no copolymer (B) to produce pellets. The physical properties of the thus obtained composition were measured by the same methods as described above. The results are shown in Table 1.

COMPARATIVE EXAMPLE 3

The same kneading procedure as in EXAMPLE 3 was repeated except for adding no copolymer (B) to produce pellets. The physical properties of the thus obtained composition were measured by the same methods as described above. The results are shown in Table 1.

COMPARATIVE EXAMPLE 4

The same kneading procedure as in EXAMPLE 4 was repeated except for adding no copolymer (B) to produce pellets. The physical properties of the thus obtained composition were measured by the same methods as described above. The results are shown in Table 1.

TABLE 1

| | Flexural modulus (MPa) | 23° C. Izod impact strength (kJ/m$^2$) | −20° C. Izod impact strength (kJ/m$^2$) | Tensile elongation (%) |
|---|---|---|---|---|
| Example 1 | 1,200 | 45 | 9.0 | >430 |
| Example 2 | 1,310 | 35 | 6.7 | 350 |
| Example 3 | 1,050 | NB (Not broken) | 11.0 | >430 |
| Example 4 | 1,490 | 14 | 4.2 | 25 |
| Comparative Example 1 | 1,140 | 9.0 | 4.8 | 250 |
| Comparative Example 2 | 1,260 | 5.7 | 3.3 | 200 |
| Comparative Example 3 | 980 | 12 | 5.8 | 200 |
| Comparative Example 4 | 1,470 | 3.2 | 1.8 | 5 |

EXAMPLE 5

[1] Preparation of Catalyst Component (1) Preparation of Aluminum Oxy Compound

One thousand milliliters of a toluene solution of methyl aluminoxane (1.47 mol/liter; available from Albemarle Corporation; containing 14.5% by mass of trimethyl aluminum) was distilled at 60° C. under reduced pressure (about 20 mmHg) to remove the toluene solvent and liberated methyl aluminum therefrom. Then, dehydrated toluene was added to the dried-up methyl aluminoxane to dissolve the latter again and obtain a toluene solution thereof having the same volume as that before distilling off the solvent. As a result of $^1$H-NMR measurement of the resultant solution, it was confirmed that the amount of trimethyl aluminum contained in the methyl aluminoxane was 3.6% by mass. Also, as a result of the measurement by fluorescent X-ray (ICP) method, it was confirmed that the total amount of aluminum contained in the methyl aluminoxane was 1.32 mol/liter. Thereafter, the obtained solution was allowed to stand for 48 hours to precipitate insoluble components thereof, and then filtered through a G5 glass filter to separate a solution portion from the precipitate, thereby obtaining toluene-soluble methyl aluminoxane. As a result of the measurement by IPC method, it was confirmed that the concentration of the toluene-soluble methyl aluminoxane was 1.06 mol/liter.

(2) Preparation of Carrier and Preparation of Carrier-Supported Methyl Aluminoxane Seventy grams of SiO$_2$ ("P-10" available from Fuji Silicia Co., Ltd.) was dried at 140° C. for 15 hours under a trace nitrogen flow. Then, 22.0 g of the thus dried SiO$_2$ was weighed and added to 200 ml of dehydrated toluene. After the resultant mixture was cooled to a constant temperature of 0° C. while stirring under a nitrogen atmosphere, 200 ml of the toluene solution of methyl aluminoxane prepared in the above step (1) was dropped thereinto for 60 minutes. After completion of the dropping, the resultant solution was heated to room temperature at which the solution was reacted for 30 minutes, and further heated to 70° C. at which the solution was reacted for 3 hours. After completion of the reaction, the obtained reaction mixture was held at 60° C., and the solid component thereof was washed with 200 ml of dehydrated toluene twice and then with 200 ml of dehydrated heptane twice. The obtained solids were dried at 50° C. under reduced pressure to obtain 32.8 g of SiO$_2$-supported methyl aluminoxane. The thus obtained SiO$_2$-supported methyl aluminoxane was charged again into dehydrated heptane and preserved in the form of a slurry.

(3) Preparation of Carrier-Supported Metallocene Catalyst

A 100 ml Schlenk tube was dried and purged with nitrogen, and then charged with 50 ml of dried heptane and 10 mmol (in terms of aluminum atom) of the SiO$_2$-supported methyl aluminoxane prepared in the above step (2), followed by initiation of stirring. One milliliter of a toluene solution containing racemic dimethylsilylenebis(2-methyl-4-phenyl-indenyl)zirconium dichloride [rac-SiMe$_2$(2-Me-4-Ph-Ind)$_2$ZrCl$_2$] in an amount of 10 μmol in terms of zirconium atom, was slowly added to the SiO$_2$-supported methyl aluminoxane, and reacted for 10 minutes.

[2] Production of Graft Polymer [Copolymer (B)]

A 5 liter stainless steel pressure-tight autoclave was charged with 2 liters of dehydrated heptane and 2.5 mmol of triisobutyl aluminum, and the mixture was stirred at room temperature for 10 minutes. Then, a whole amount of the supported catalyst prepared in the above step (3) was added to the autoclave.

The above catalyst was used to prepolymerize propylene at 25° C. under a propylene pressure of 0.3 MPa (gauge pressure) for 30 minutes to activate the catalyst, and then the reaction mixture was subjected to depressurization and blowing with nitrogen to remove unreacted propylene therefrom. Then, 4.0 ml of a heptane solution containing 2.5 mmol of 1,9-decadiene was added to the obtained reaction solution, and then hydrogen was introduced thereinto until reaching 0.02 MPa (gauge pressure). After setting the reaction temperature at 60° C. and introducing propylene until reaching a propylene partial pressure of 0.7 MPa (gauge pressure), the polymerization reaction was initiated and continued for 30 minutes while controlling the reaction temperature to obtain a propylene copolymer.

After completion of the reaction, the resultant reaction solution was cooled to room temperature and depressurized, and after termination of stirring, the liquid phase thereof was separated therefrom. Further, the obtained solid reaction product was washed with a heptane solution of triisobutyl aluminum (1.25 mol/liter) three times by decantation method, and then a suitable amount of the heptane solution of triisobutyl aluminum (1.25 mol/liter) was added thereto to adjust a total volume of the solution to 2 liters.

Then, while controlling the reaction temperature to 35° C., propylene and ethylene were supplied at feed rates of 9 normal liters/min and 1.5 normal liters/min, respectively, to adjust a whole pressure to 0.7 MPa (gauge pressure), thereby conducting the graft polymerization for 30 minutes. After completion of the polymerization, the reaction mixture was depressurized, filtered and then dried to recover 712 g of a graft polymer. As a result, it was confirmed that the thus obtained graft polymer had a meso-pentad fraction of propylene chains of 95.0% and an intrinsic viscosity [η] of 2.15 dl/g, and the yield of the propylene polymer at the first stage was 78% by mass.

[3] Evaluation of Branched Structure of Graft Polymer (1) Preparation of Comparative Specimen (Linear Polymer)

The same procedure as in the above step [2] was repeated except for using no 1,9-decadiene, to obtain a comparative specimen.

(2) Method for Measurement of Branched Structure

The branched structure was measured by the method and under the conditions described in the paragraph "(iii) Branching Parameter (α)" in the present specification.

(3) Evaluation of Branched Structure

The branched structure of the above obtained comparative specimen was measured by the method as described in the above step (2) to calculate the branching parameter (α) thereof as $(α)^L$, and the branched structure of the graft polymer was similarly measured to calculate the branching parameter (α) thereof as $(α)^B$. As a result, it was confirmed that the ratio $[(α)^L/(α)^B]$ was 1.09, i.e., exceeded 1 which indicated that the obtained polymer was a graft polymer.

[4] Production of Propylene-Ethylene Block Copolymer [Propylene (co)Polymer (A)]

Propylene and ethylene were batch-polymerized in a heptane solvent in the presence of a catalyst composed of the titanium catalyst prepared by the method as described in Example 1 of Japanese Patent Publication No. Hei 2-61483 and an organoaluminum compound (triethyl aluminum) using hydrogen as a chain transfer agent to produce a propylene-ethylene block copolymer.

It was confirmed that the thus obtained propylene-ethylene block copolymer had a MFR of 4.0 g/10 min, a meso-pentad fraction of an ordinary temperature (25° C.) xylene-insoluble component of 94.0% and a content of an ordinary temperature (25° C.) xylene-soluble component of 17.3% by mass.

[5] Production of Polyolefin-Based Resin Composition 9.5 kg of the propylene-ethylene block copolymer obtained in the above step [4], 0.5 kg of the graft polymer obtained in the above step [2], 15 g of a phenol-based antioxidant "IRGANOX 1010" available from Ciba Specialty Chemicals Corp., and 7.5 g of an antioxidant "P-EPQ" available from Asahi Denka Kogyo Co., Ltd., were intimately premixed together and kneaded using a twin-screw extruder "TEX-30" (available from Nippon Seikosho Co., Ltd.) having a screw diameter of 32 mm at a cylinder set temperature of 200° C. at a screw-rotating speed of 300 rpm and an extrusion output of 10 kg/30 min to produce pellets of a polyolefin-based resin composition. The physical properties of the thus obtained composition were measured by the same method as used in EXAMPLE 1. The results are shown in Table 2.

EXAMPLE 6

[1] Production of Propylene-Ethylene Block Copolymer [Propylene (co)Polymer (A)]

The same procedure as in [4] of EXAMPLE 5 was repeated except for varying the amount of hydrogen added and the amount of the copolymerization moieties, to produce a propylene-ethylene block copolymer having the following properties.

It was confirmed that the thus obtained propylene-ethylene block copolymer had a MFR of 12.0 g/10 min, a meso-pentad fraction of an ordinary temperature (25° C.) xylene-insoluble component of 94.1% and a content of an ordinary temperature (25° C.) xylene-soluble component of 12.0% by mass.

[2] Production of Polyolefin-Based Resin Composition

The same procedure as in EXAMPLE 5 was repeated except for using, as a copolymer (A), 9.5 kg of the propylene-ethylene block copolymer obtained in the above step [1], to produce pellets of a polyolefin-based resin composition. The physical properties of the obtained polyolefin-based resin composition were measured by the same methods as used in EXAMPLE 5. The results are shown in Table 2.

EXAMPLE 7

[1] Production of Propylene-Ethylene Block Copolymer [Propylene (co)Polymer (A)]

The same procedure as in [4] of EXAMPLE 5 was repeated except for varying the amount of hydrogen added and the amount of the copolymerization moieties, to produce a propylene-ethylene block copolymer having the following properties.

It was confirmed that the thus obtained propylene-ethylene block copolymer had a MFR of 34.0 g/10 min, a meso-pentad fraction of an ordinary temperature (25° C.) xylene-insoluble component of 95.7% and a content of an ordinary temperature (25° C.) xylene-soluble component of 10.2% by mass.

[2] Production of Polyolefin-Based Resin Composition

The same procedure as in EXAMPLE 5 was repeated except for using, as a copolymer (A), 9.5 kg of the propylene-ethylene block copolymer obtained in the above step [1], to produce pellets of a polyolefin-based resin composition. The physical properties of the obtained polyolefin-based resin composition were measured by the same methods as used in EXAMPLE 5. The results are shown in Table 2.

EXAMPLE 8

[1] Production of Propylene-Ethylene Block Copolymer [Propylene (co)Polymer (A)]

The same procedure as in [4] of EXAMPLE 5 was repeated except for varying the amount of hydrogen added as well as the amount of the copolymerization moieties, to produce a propylene-ethylene block copolymer having the following properties.

It was confirmed that the thus obtained propylene-ethylene block copolymer had a MFR of 44.0 g/10 min, a meso-pentad fraction of an ordinary temperature (25° C.) xylene-insoluble component of 94.3% and a content of an ordinary temperature (25° C.) xylene-soluble component of 10.2% by mass.

[2] Production of Polyolefin-Based Resin Composition

The same procedure as in EXAMPLE 5 was repeated except for using, as a copolymer (A), 9.5 kg of the propylene-ethylene block copolymer obtained in the above step [1], to produce pellets of a polyolefin-based resin composition. The physical properties of the obtained polyolefin-based resin composition were measured by the same methods as used in EXAMPLE 5. The results are shown in Table 2.

EXAMPLE 9

[1] Production of Propylene-Ethylene Block Copolymer [Propylene (co)Polymer (A)]

The same procedure as in [4] of EXAMPLE 5 was repeated except for varying the amount of hydrogen added as well as the amount of the copolymerization moieties, to produce a propylene-ethylene block copolymer having the following properties.

It was confirmed that the thus obtained propylene-ethylene block copolymer had a MFR of 110.0 g/10 min, a meso-pentad fraction of an ordinary temperature (25° C.) xylene-insoluble component of 95.5% and a content of an ordinary temperature (25° C.) xylene-soluble component of 10.5% by mass.

[2] Production of Polyolefin-Based Resin Composition 8.5 kg of the propylene-ethylene block copolymer as a copolymer (A) obtained in the above step [1], 1.5 kg of the graft polymer obtained in the step [2] of EXAMPLE 5, 15 g of a phenol-based antioxidant "IRGANOX 1010" available from Ciba Specialty Chemicals Corp., and 7.5 g of an antioxidant "P-EPQ" available from Asahi Denka Kogyo Co., Ltd., were intimately premixed together and kneaded using a twin-screw extruder "TEX-30" (available from Nippon Seikosho Co., Ltd.) having a screw diameter of 32 mm under the same conditions as used in EXAMPLE 5 to produce pellets of a polyolefin-based resin composition. The physical properties of the thus obtained composition were measured by the same methods as used in EXAMPLE 1. The results are shown in Table 2.

COMPARATIVE EXAMPLE 5

The same kneading procedure as in EXAMPLE 5 was repeated except for adding no copolymer (B) to produce pellets. The physical properties of the thus obtained composition were measured by the same methods as described above. The results are shown in Table 2.

COMPARATIVE EXAMPLE 6

The same kneading procedure as in EXAMPLE 6 was repeated except for adding no copolymer (B) to produce pellets. The physical properties of the thus obtained composition were measured by the same methods as described above. The results are shown in Table 2.

COMPARATIVE EXAMPLE 7

The same kneading procedure as in EXAMPLE 7 was repeated except for adding no copolymer (B) to produce pellets. The physical properties of the thus obtained composition were measured by the same methods as described above. The results are shown in Table 2.

COMPARATIVE EXAMPLE 8

The same kneading procedure as in EXAMPLE 8 was repeated except for adding no copolymer (B) to produce pellets. The physical properties of the thus obtained composition were measured by the same methods as described above. The results are shown in Table 2.

COMPARATIVE EXAMPLE 9

The same kneading procedure as in EXAMPLE 9 was repeated except for adding no copolymer (B) to produce pellets. The physical properties of the thus obtained composition were measured by the same methods as described above. The results are shown in Table 2.

TABLE 2

| | Flexural modulus (MPa) | 23° C. Izod impact strength (kJ/m$^2$) | −20° C. Izod impact strength (kJ/m$^2$) | Tensile elongation (%) |
|---|---|---|---|---|
| Example 5 | 833 | NB | 12 | >430 |
| Example 6 | 1,230 | 35 | 8.2 | >430 |
| Example 7 | 1,452 | 23 | 4.0 | 253 |
| Example 8 | 1,243 | 25 | 4.0 | 190 |
| Example 9 | 1,420 | 14 | 3.8 | 27 |
| Comparative Example 5 | 825 | 58 | 5.9 | >430 |
| Comparative Example 6 | 1,217 | 9.0 | 4.6 | 260 |
| Comparative Example 7 | 1,430 | 6.0 | 2.3 | 146 |
| Comparative Example 8 | 1,224 | 6.1 | 3.1 | 130 |
| Comparative Example 9 | 1,390 | 3.2 | 1.9 | 7 |

EXAMPLE 10

[1] Preparation of Catalyst Component (1) Preparation of Aluminum Oxy Compound

One thousand milliliters of a toluene solution of methyl aluminoxane (1.47 mol/liter; available from Albemarle Corporation; containing 14.5% by mass of trimethyl aluminum) was distilled at 60° C. under reduced pressure (about 20 mmHg) to remove the toluene solvent and liberated methyl aluminum therefrom. Then, dehydrated toluene was added to the dried-up methyl aluminoxane to dissolve the latter again and obtain a toluene solution thereof having the same volume as that before distilling off the solvent. As a result of $^1$H-NMR measurement of the resultant solution, it was confirmed that the amount of trimethyl aluminum contained in the methyl aluminoxane was 3.6% by mass. Also, as a result of the measurement by fluorescent X-ray (ICP) method, it was confirmed that the total amount of aluminum contained in the methyl aluminoxane was 1.32 mol/liter. Thereafter, the obtained solution was allowed to stand for 48 hours to precipitate insoluble components thereof, and then filtered through a G5 glass filter to separate a solution portion from the precipitate, thereby obtaining toluene-soluble methyl aluminoxane. As a result of the measurement by IPC method, it was confirmed that the concentration of the toluene-soluble methyl aluminoxane was 1.06 mol/liter.

(2) Preparation of Carrier and Preparation of Carrier-Supported Methyl Aluminoxane Seventy grams of $SiO_2$ ("P-10" available from Fuji Silicia Co., Ltd.) was dried at 140° C. for 15 hours under a trace nitrogen flow. Then, 22.0 g of the thus dried $SiO_2$ was weighed and added to 200 ml of dehydrated toluene. After the resultant mixture was cooled to a constant temperature of 0° C. while stirring under a nitrogen atmosphere, 200 ml of the toluene solution of methyl aluminoxane prepared in the above step (1) was dropped thereinto for 60 minutes. After completion of the dropping, the resultant solution was heated to room temperature at which the solution was reacted for 30 minutes, and further heated to 70° C. at which the solution was reacted for 3 hours. After completion of the reaction, the obtained reaction mixture was held at 60° C., and the solid component thereof was washed with 200 ml of dehydrated toluene twice and then with 200 ml of dehydrated heptane twice. The obtained solids were dried at 50° C. under reduced pressure to obtain 32.8 g of $SiO_2$-supported methyl aluminoxane. The thus obtained $SiO_2$-supported methyl aluminoxane was charged again into dehydrated heptane and preserved in the form of a slurry.

(3) Preparation of Carrier-Supported Metallocene Catalyst

A 100 ml Schlenk tube was dried and purged with nitrogen, and then charged with 50 ml of dried heptane and 10 mmol (in terms of aluminum atom) of the $SiO_2$-supported methyl aluminoxane prepared in the above step (2), followed by initiation of stirring. One milliliter of a toluene solution containing racemic dimethylsilylenebis(2-methyl-4-phenyl-indenyl)zirconium dichloride [rac-SiMe$_2$(2-Me-4-Ph-Ind)$_2$ZrCl$_2$] in an amount of 10 μmol in terms of zirconium atom, was slowly added to the $SiO_2$-supported methyl aluminoxane, and reacted for 10 minutes.

[2] Production of Graft Polymer [Copolymer (B)]

A 5 liter stainless steel pressure-tight autoclave was charged with 2 liters of dehydrated heptane and 2.5 mmol of triisobutyl aluminum, and the mixture was stirred at room temperature for 10 minutes. Then, a whole amount of the supported catalyst prepared in the above step (3) was added to the autoclave.

The above catalyst was used to prepolymerize propylene at 25° C. under a propylene pressure of 0.3 MPa (gauge pressure) for 30 minutes to activate the catalyst, and then the resultant mixture was subjected to depressurization and blowing with nitrogen to remove unreacted propylene therefrom. Then, 4.0 ml of a heptane solution containing 2.5 mmol of 1,9-decadiene was added to the obtained reaction solution, and then hydrogen was introduced thereinto until reaching 0.02 MPa (gauge pressure). After setting the reaction temperature at 60° C. and introducing propylene until reaching a propylene partial pressure of 0.7 MPa (gauge pressure), the polymerization reaction was initiated and continued for 30 minutes while controlling the reaction temperature to obtain a propylene copolymer.

After completion of the reaction, the resultant reaction solution was cooled to room temperature and depressurized, and after termination of stirring, the liquid phase thereof was separated therefrom. Further, the solid reaction product was washed with a heptane solution of triisobutyl aluminum (1.25 mol/liter) three times by decantation method, and then a suitable amount of the heptane solution of triisobutyl aluminum (1.25 mol/liter) was added to adjust a total volume of the solution to 2 liters.

Then, while controlling the reaction temperature to 35° C., propylene and ethylene were supplied at feed rates of 9 normal liters/min and 1.5 normal liters/min, respectively, to adjust a whole pressure to 0.7 MPa (gauge pressure), thereby conducting the graft polymerization for 30 minutes. After completion of the polymerization, the reaction mixture was depressurized, filtered and then dried to recover 712 g of a graft polymer. As a result, it was confirmed that the thus obtained graft polymer had a meso-pentad fraction of propylene chains of 95.0% and an intrinsic viscosity [η] of 2.15 dl/g, and the yield of the propylene polymer at the first stage was 78% by mass.

[3] Evaluation of Branched Structure of Graft Polymer (1) Preparation of Comparative Specimen (Linear Polymer)

The same procedure as in the above step [2] was repeated except for using no 1,9-decadiene, to prepare a comparative specimen.

(2) Method for Measurement of Branched Structure

The branched structure was measured by the method and under the conditions as described in the paragraph "(iii) Branching Parameter (α)" in the present specification.

(3) Evaluation of Branched Structure

The branched structure of the above obtained comparative specimen was measured by the method described in the above (2) to calculate the branching parameter (α) thereof as $(\alpha)^L$, and the branched structure of the graft polymer was similarly measured to calculate the branching parameter (α) thereof as $(\alpha)^B$. As a result, it was confirmed that the ratio $[(\alpha)^L/(\alpha)^B]$ was 1.09, i.e., exceeded 1 which indicated that the obtained polymer was a graft polymer.

[4] Production of Propylene-Ethylene Block Copolymer [Propylene (co)Polymer (A)]

Propylene and ethylene were batch-polymerized in a heptane solvent in the presence of a catalyst composed of the solid titanium catalyst component (prepolymerized product) as described in EXAMPLE 1 of Japanese Patent Application Laid-open No. Hei 2-84404, an organoaluminum compound (triethyl aluminum) and a silicon compound (dicyclopentyldimethoxysilane) using hydrogen as a chain transfer agent to produce a propylene-ethylene block copolymer.

It was confirmed that the thus obtained propylene-ethylene block copolymer had a MFR of 10.5 g/10 min, a meso-pentad fraction of an ordinary temperature (25° C.) xylene-insoluble component of 97.4% and a content of an ordinary temperature (25° C.) xylene-soluble component of 12% by mass.

[5] Production of Polyolefin-Based Resin Composition 9.5 kg of the propylene-ethylene block copolymer obtained in the above step [4], 0.5 kg of the graft polymer obtained in the above step [2], 1.0 kg of talc (tradename "JM156" available from Asada Seifun Co., Ltd.), 15 g of a phenol-based antioxidant "IRGANOX 1010" available from Ciba Specialty Chemicals Corp., and 7.5 g of an antioxidant "P-EPQ" available from Asahi Denka Kogyo Co., Ltd., were intimately premixed together and kneaded using a twin-screw extruder "TEX-30" (available from Nippon Seikosho Co., Ltd.) having a screw diameter of 32 mm at a cylinder set temperature of 200° C. at a screw-rotating speed of 300 rpm and an extrusion output of 10 kg/30 min to produce pellets of a polyolefin-based resin composition. The physical properties of the thus obtained composition were measured by the same methods as used in EXAMPLE 1. The results are shown in Table 3.

EXAMPLE 11

[1] Production of Propylene-Ethylene Block Copolymer [Propylene (co)Polymer (A)]

Propylene and ethylene were batch-polymerized in a heptane solvent in the presence of a catalyst composed of the titanium catalyst as described in Example 1 of Japanese Patent Publication No. Hei 2-61483 and an organoaluminum compound (triethyl aluminum) using hydrogen as a chain transfer agent to produce a propylene-ethylene block copolymer.

It was confirmed that the thus obtained propylene-ethylene block copolymer had a MFR of 34.0 g/10 min, a meso-pentad fraction of an ordinary temperature (25° C.) xylene-insoluble component of 95.7% and a content of an ordinary temperature (25° C.) xylene-soluble component of 10.2% by mass.

[2] Production of Polyolefin-Based Resin Composition

The same procedure as in EXAMPLE 10 was repeated except for using, as a copolymer (A), 9.5 kg of the propylene-ethylene block copolymer obtained in the above step [1] to produce pellets of a polyolefin-based resin composition. The physical properties of the obtained polyolefin-based resin composition were measured by the same methods as used in EXAMPLE 1. The results are shown in Table 3.

EXAMPLE 12

[1] Production of Propylene-Ethylene Block Copolymer [Propylene (co)Polymer (A)]

The same procedure as in [1] of EXAMPLE 11 was repeated except for varying the amount of hydrogen added as well as the amount of the copolymerization moieties to produce a propylene-ethylene block copolymer having the following properties.

It was confirmed that the thus obtained propylene-ethylene block copolymer had a MFR of 44.0 g/10 min, a meso-pentad fraction of an ordinary temperature (25° C.) xylene-insoluble component of 94.3% and a content of an ordinary temperature (25° C.) xylene-soluble component of 10.2% by mass.

[2] Production of Polyolefin-Based Resin Composition

The same procedure as in EXAMPLE 10 was repeated except for using, as a copolymer (A), 9.5 kg of the propylene-ethylene block copolymer obtained in the above step [1] to produce pellets of a polyolefin-based resin composition. The physical properties of the obtained polyolefin-based resin composition were measured by the same methods as used in EXAMPLE 10. The results are shown in Table 3.

EXAMPLE 13

[1] Production of Propylene-Ethylene Block Copolymer [Propylene (co)Polymer (A)]

The same procedure as in [4] of EXAMPLE 10 was repeated except for varying the amount of hydrogen added as well as the amount of the copolymerization moieties to produce a propylene-ethylene block copolymer having the following properties.

It was confirmed that the thus obtained propylene-ethylene block copolymer had a MFR of 110.0 g/10 min, a meso-pentad fraction of an ordinary temperature (25° C.) xylene-insoluble component of 97.5% and a content of an ordinary temperature (25° C.) xylene-soluble component of 6.4% by mass.

[2] Production of Polyolefin-Based Resin Composition 9.5 kg of the propylene-ethylene block copolymer as a copolymer (A) obtained in the above step [1], 0.5 kg of the graft polymer obtained in the step [2] of EXAMPLE 11, 2.0 kg of talc (tradename "JM156" available from Asada Seifun Co., Ltd.), 15 g of a phenol-based antioxidant "IRGANOX 1010" available from Ciba Specialty Chemicals Corp., and 5 g of an antioxidant "P-EPQ" available from Asahi Denka Kogyo Co., Ltd., were intimately premixed together and kneaded using a twin-screw extruder "TEX-30" (available from Nippon Seikosho Co., Ltd.) having a screw diameter of 32 mm under the same conditions as used in EXAMPLE 10 to produce pellets of a polyolefin-based resin composition. The physical properties of the thus obtained composition were measured by the same method as used in EXAMPLE 10. The results are shown in Table 3.

COMPARATIVE EXAMPLE 10

The same kneading procedure as in EXAMPLE 10 was repeated except for adding no copolymer (B) and adding the copolymer (A) in an amount of 10 kg to produce pellets. The physical properties of the thus obtained composition were measured by the same methods as described above. The results are shown in Table 3.

COMPARATIVE EXAMPLE 11

The same kneading procedure as in EXAMPLE 11 was repeated except for adding no copolymer (B) and adding the copolymer (A) in an amount of 10 kg to produce pellets. The physical properties of the thus obtained composition were measured by the same methods as described above. The results are shown in Table 3.

COMPARATIVE EXAMPLE 12

The same kneading procedure as in EXAMPLE 12 was repeated except for adding no copolymer (B) and adding the copolymer (A) in an amount of 10 kg to produce pellets. The physical properties of the thus obtained composition were measured by the same methods as described above. The results are shown in Table 3.

COMPARATIVE EXAMPLE 13

The same kneading procedure as in EXAMPLE 13 was repeated except for adding no copolymer (B) and adding the copolymer (A) in an amount of 10 kg to produce pellets. The physical properties of the thus obtained composition were measured by the same methods as described above. The results are shown in Table 3.

TABLE 3

|  | Flexural modulus (MPa) | 23° C. Izod impact strength (kJ/m$^2$) | −20° C. Izod impact strength (kJ/m$^2$) | Tensile elongation (%) |
|---|---|---|---|---|
| Example 10 | 2,020 | 12 | 4.8 | 250 |
| Example 11 | 1,960 | 7.0 | 3.5 | 85 |
| Example 12 | 2,450 | 7.2 | 3.2 | 10 |
| Example 13 | 2,720 | 3.4 | 2.0 | 10 |
| Comparative Example 10 | 2,000 | 8.5 | 4.7 | 120 |
| Comparative Example 11 | 1,950 | 5.4 | 2.3 | 10 |
| Comparative Example 12 | 2,450 | 6.0 | 3.0 | 6 |
| Comparative Example 13 | 2,700 | 3.0 | 1.8 | 5 |

The following Examples 14 to 16 show Production Examples of propylene (co)polymer [copolymer (A)], copolymer (B) and polyolefin-based resin composition.

1. Production of Propylene (co)Polymer [Copolymer (A)]

EXAMPLE 14-1

Propylene and ethylene were batch-polymerized in a heptane solvent in the presence of a catalyst composed of the solid titanium catalyst component (prepolymerized product) as described in EXAMPLE 1 of Japanese Patent Application Laid-open No. Hei 2-84404, an organoaluminum compound (triethyl aluminum) and a silicon-based compound (dicyclopentyldimethoxysilane) using hydrogen as a chain transfer agent to produce a propylene-ethylene block copolymer.

It was confirmed that the thus obtained propylene copolymer had a MFR of 110 g/10 min, a meso-pentad fraction of an ordinary temperature (25° C.) xylene-insoluble component of 97.5% and a content of an ordinary temperature (25° C.) xylene-soluble component of 6.4% by mass.

EXAMPLE 14-2

Propylene and ethylene were batch-polymerized in a heptane solvent in the presence of a catalyst composed of the titanium catalyst obtained by the method as described in EXAMPLE 1 of Japanese Patent Publication No. Hei 2-61483 and an organoaluminum compound (triethyl aluminum) using hydrogen as a chain transfer agent to produce a propylene-ethylene block copolymer.

It was confirmed that the thus obtained propylene-ethylene block copolymer had a MFR of 110 g/10 min, a meso-pentad fraction of an ordinary temperature (25° C.) xylene-insoluble component of 95.5% and a content of an ordinary temperature (25° C.) xylene-soluble component of 10.5% by mass.

EXAMPLE 14-3

The same procedure as in EXAMPLE 14-2 was repeated except for varying the amount of hydrogen added to produce a propylene-ethylene block copolymer having the following properties.

It was confirmed that the thus obtained propylene copolymer had a MFR of 44.0 g/10 min, a meso-pentad fraction of an ordinary temperature (25° C.) xylene-insoluble component of 94.3% and a content of an ordinary temperature (25° C.) xylene-soluble component of 10.2% by mass.

EXAMPLE 14-4

The same procedure as in EXAMPLE 14-2 was repeated except for varying the amount of hydrogen added to produce a propylene-ethylene block copolymer having the following properties.

It was confirmed that the thus obtained propylene copolymer had a MFR of 34.0 g/10 min, a meso-pentad fraction of an ordinary temperature (25° C.) xylene-insoluble component of 95.7% and a content of an ordinary temperature (25° C.) xylene-soluble component of 10.2% by mass.

EXAMPLE 14-5

The same procedure as in EXAMPLE 14-2 was repeated except for varying the amount of hydrogen added as well as the amount of the copolymerization moieties to produce a propylene-ethylene block copolymer having the following properties.

It was confirmed that the thus obtained propylene copolymer had a MFR of 12.0 g/10 min, a meso-pentad fraction of an ordinary temperature (25° C.) xylene-insoluble component of 94.1% and a content of an ordinary temperature (25° C.) xylene-soluble component of 12.0% by mass.

EXAMPLE 14-6

The same procedure as in EXAMPLE 14-1 was repeated except for varying the amount of hydrogen added as well as the amount of the copolymerization moieties to produce a propylene-ethylene block copolymer having the following properties.

It was confirmed that the thus obtained propylene copolymer had a MFR of 10.5 g/10 min, a meso-pentad fraction of an ordinary temperature (25° C.) xylene-insoluble component of 97.4% and a content of an ordinary temperature (25° C.) xylene-soluble component of 12.0% by mass.

EXAMPLE 14-7

The same procedure as in EXAMPLE 14-2 was repeated except for varying the amount of hydrogen added as well as the amount of the copolymerization moieties to produce a propylene-ethylene block copolymer having the following properties.

It was confirmed that the thus obtained propylene copolymer had a MFR of 4.0 g/10 min, a meso-pentad fraction of an ordinary temperature (25° C.) xylene-insoluble component of 94.0% and a content of an ordinary temperature (25° C.) xylene-soluble component of 17.3% by mass.

2. Production of Copolymer (B)

EXAMPLE 15-1

[1] Preparation of Catalyst Component (1) Preparation of Aluminum Oxy Compound

One thousand milliliters of a toluene solution of methyl aluminoxane (1.47 mol/liter; available from Albemarle Corporation; containing 14.5% by mass of trimethyl aluminum) was distilled at 60° C. under reduced pressure (about 2.67 kPa) to remove the toluene solvent and liberated trimethyl aluminum therefrom. Then, dehydrated toluene was added to the dried-up methyl aluminoxane to dissolve the latter again and obtain a toluene solution thereof having the same volume as that before distilling off the solvent. As a result of $^1$H-NMR measurement of the resultant solution, it was confirmed that the amount of trimethyl aluminum contained in the methyl aluminoxane was 3.6% by mass. Also, as a result of the measurement by fluorescent X-ray (ICP) method, it was confirmed that the total amount of aluminum contained in the methyl aluminoxane was 1.32 mol/liter.

Thereafter, the obtained solution was allowed to stand for 48 hours to precipitate insoluble components thereof, and then filtered through a G5 glass filter to separate a solution portion from the precipitate, thereby obtaining toluene-soluble methyl aluminoxane. As a result of the measurement by IPC method, it was confirmed that the concentration of the toluene-soluble methyl aluminoxane was 1.06 mol/liter.

(2) Preparation of Carrier and Preparation of Carrier-Supported Methyl Aluminoxane Seventy grams of $SiO_2$ ("P-10" available from Fuji Silicia Co., Ltd.) was dried at 140° C. for 15 hours under a trace nitrogen flow. Then, 22.0 g of the thus dried $SiO_2$ was weighed and added to 200 ml of dehydrated toluene. After the resultant mixture was cooled to a constant temperature of 0° C. while stirring under a nitrogen atmosphere, 200 ml of the toluene solution of methyl aluminoxane prepared in the above step (1) was dropped thereinto for 60 minutes. After completion of the dropping, the resultant solution was heated to room temperature at which the solution was reacted for 30 minutes, and further heated to 70° C. at which the solution was reacted for 3 hours. After completion of the reaction, the obtained reaction mixture was held at 60° C., and the solid component thereof was washed with 200 ml of dehydrated toluene twice and then with 200 ml of dehydrated heptane twice. The obtained solids were dried at 50° C. under reduced pressure to obtain 32.8 g of $SiO_2$-supported methyl aluminoxane. The thus obtained $SiO_2$-supported methyl aluminoxane was charged again into dehydrated heptane and preserved in the form of a slurry.

(3) Preparation of Carrier-Supported Metallocene Catalyst

A 100 ml Schlenk tube was dried and purged with nitrogen, and then charged with 50 ml of dried heptane and 10 mmol (in terms of aluminum atom) of the $SiO_2$-supported methyl aluminoxane prepared in the above step (2), followed by initiation of stirring. Ten milliliters of a toluene solution containing racemic dimethylsilylenebis(2-methyl-4-phenyl-indenyl)zirconium dichloride [rac-SiMe$_2$(2-Me-4-Ph-Ind)$_2$ZrCl$_2$] in an amount of 10 μmol in terms of zirconium atom, was slowly added to the $SiO_2$-supported methyl aluminoxane, and reacted for 10 minutes.

[2] Production of Graft Copolymer [Copolymer (B)]

A 5 liter stainless steel pressure-tight autoclave was charged with 2 liters of dehydrated heptane and 2.5 mmol of triisobutyl aluminum, and the mixture was stirred at room temperature for 10 minutes. Then, a whole amount of the supported catalyst prepared in the above step (3) was added to the autoclave.

The above catalyst the was used to prepolymerize propylene at 25° C. under a propylene pressure of 0.3 MPa (gauge pressure) for 30 minutes to activate the catalyst, and then the resultant mixture was subjected to depressurization and blowing with nitrogen to remove unreacted propylene therefrom. Then, 4.0 ml of a heptane solution containing 2.5 mmol of 1,9-decadiene was added to the obtained reaction solution, and then hydrogen was introduced thereinto until reaching 0.02 MPa (gauge pressure). After setting the reaction temperature at 60° C. and introducing propylene until reaching a propylene partial pressure of 0.7 MPa (gauge pressure), the polymerization reaction was initiated and continued for 30 minutes while controlling the reaction temperature to obtain a propylene copolymer.

After completion of the reaction, the resultant reaction solution was cooled to room temperature and depressurized, and after termination of stirring, the liquid phase thereof was separated therefrom. Further, the obtained solid reaction product was washed with a heptane solution of triisobutyl aluminum (1.25 mol/liter) three times by decantation method, and then a suitable amount of the heptane solution of triisobutyl aluminum (1.25 mol/liter) was added thereto to adjust a total volume of the solution to 2 liters.

Then, while controlling the reaction temperature to 35° C., propylene and ethylene were supplied at feed rates of 9 normal liters/min and 1.5 normal liters/min, respectively, to adjust a whole pressure to 0.7 MPa (gauge pressure), thereby conducting the graft polymerization for 30 minutes. After completion of the polymerization, the reaction mixture was depressurized, filtered and then dried to recover a graft copolymer at a yield of 712 g. As a result, it was confirmed that the thus obtained graft copolymer had a meso-pentad fraction of propylene chains of 95.0% and an intrinsic viscosity [η] of 2.15 dl/g, and the yield of the propylene polymer at the first stage was 78% by mass.

[3] Evaluation of Branched Structure of Graft Polymer (1) Preparation of Comparative Specimen (Linear Polymer)

The same procedure as in the above step [2] was repeated except for using no 1,9-decadiene, to prepare a comparative specimen.

(2) Method for Measurement of Branched Structure

The branched structure was measured by the method and under the conditions as described in the paragraph "(iii) Branching Parameter (a)" in the present specification.

(3) Evaluation of Branched Structure

The branched structure of the above obtained comparative specimen was measured by the method described in the above step (2) to calculate the branching parameter (α) thereof as $(\alpha)^L$, and the branched structure of the graft polymer was similarly measured to calculate the branching parameter (α) thereof as $(\alpha)^B$. As a result, it was confirmed that the ratio $[(\alpha)^L/(\alpha)^B]$ was 1.09, i.e., exceeded 1 which indicated that the obtained polymer was a graft polymer.

EXAMPLE 15-2

A 5 liter stainless steel pressure-tight autoclave was charged with 2 liters of dehydrated heptane and 2.5 mmol of triisobutyl aluminum, and the mixture was stirred at room temperature for 10 minutes. Then, a whole amount of the supported catalyst prepared by the same method as in the step [1] of EXAMPLE 15-1 was added to the autoclave.

The above catalyst was used to prepolymerize propylene at 25° C. under a propylene pressure of 0.3 MPa (gauge pressure) for 30 minutes to activate the catalyst, and then the resultant mixture was subjected to depressurization and blowing with nitrogen to remove unreacted propylene therefrom. Then, 4.0 ml of a heptane solution containing 2.5 mmol of 1,9-decadiene was added to the obtained reaction solution, and then hydrogen was introduced thereinto until reaching 0.02 MPa (gauge pressure). After setting the reaction temperature at 60° C. and introducing propylene until reaching a propylene partial pressure of 0.7 MPa (gauge pressure), the polymerization reaction was initiated and continued for 30 minutes while controlling the reaction temperature to obtain a propylene copolymer.

After completion of the reaction, the resultant reaction solution was cooled to room temperature and depressurized, and after termination of stirring, the liquid phase thereof was separated therefrom. Further, the obtained solid reaction product was washed with a heptane solution of triisobutyl aluminum (1.25 mol/liter) three times by decantation method, and then a suitable amount of the heptane solution of triisobutyl aluminum (1.25 mol/liter) was added thereto to adjust a total volume of the solution to 2 liters.

Then, while controlling the reaction temperature to 35° C., 200 g of butene-1 was supplied, and ethylene was supplied so as to control a whole pressure to 0.7 MPa (gauge pressure), thereby conducting the graft polymerization for 2 hours. After completion of the polymerization, the reaction mixture was depressurized, filtered and then dried to recover a graft copolymer at a yield of 755 g. As a result, it was confirmed that the thus obtained graft copolymer had a meso-pentad fraction of propylene chains of 95.5% and an intrinsic viscosity [η] of 2.65 dl/g, and the yield of the propylene polymer at the first stage was 80% by mass.

The branched structure of the obtained propylene polymer was evaluated by the same method as in EXAMPLE 15-1. As a result, it was confirmed that the ratio $[(\alpha)^L/(\alpha)^B]$ was 1.08, i.e., exceeded 1 which indicated that the obtained polymer was a graft polymer.

EXAMPLE 15-3

The same procedure as in EXAMPLE 15-2 was repeated except for using the supported catalyst prepared by the same method as in [1] of EXAMPLE 15-1 and replacing 200 g of butene-1 with 210 ml of octene-1, to produce 812 g of a graft copolymer. It was confirmed that the thus obtained graft copolymer had a meso-pentad fraction of propylene chains of 95.3% and an intrinsic viscosity [η] of 2.05 dl/g, and the yield of the propylene polymer at the first stage was 75% by mass.

The branched structure of the obtained propylene polymer was evaluated by the same method as in EXAMPLE 15-1. As a result, it was confirmed that the ratio $[(\alpha)^L/(\alpha)^B]$ was 1.08, i.e., exceeded 1 which indicated that the obtained polymer was a graft polymer.

EXAMPLE 15-4

The same procedure as in [1] of EXAMPLE 15-1 was repeated to prepare a supported catalyst. Then, in the same manner as in EXAMPLE 15-1, the thus obtained supported catalyst was used to prepolymerize propylene at 25° C. under a propylene pressure of 0.3 MPa (gauge pressure) for 30 minutes to activate the catalyst, and then the resultant mixture was subjected to depressurization and blowing with nitrogen to remove unreacted propylene therefrom. Then, 4.0 ml of a heptane solution containing 2.5 mmol of 1,9-decadiene was added to the obtained reaction solution, and then hydrogen was introduced thereinto until reaching 0.02 MPa (gauge pressure). After setting the reaction temperature at 60° C. and introducing propylene until reaching a propylene partial pressure of 0.7 MPa (gauge pressure), the polymerization reaction was initiated and continued for 30 minutes while controlling the reaction temperature to obtain a propylene copolymer.

After completion of the reaction, the resultant reaction solution was cooled to room temperature and depressurized, and after termination of stirring, the liquid phase thereof was separated therefrom. Further, the obtained solid reaction product was washed with a heptane solution of triisobutyl aluminum (1.25 mol/liter) three times by decantation method.

Next, 20 ml of a toluene solution containing 30 μmol of (tert-butyl amide) dimethyl(tetramethyl-η5-cyclopentadienyl)silane titanium dichloride [Cp*(NtBu)SiMe$_2$TiCl$_2$] as a second catalyst component was dropped into the autoclave at 25° C. to conduct the polymerization at the same temperature for 60 minutes.

Then, after raising the reaction temperature to 60° C., 200 ml of styrene was added to the obtained reaction mixture, and the reaction temperature was further raised to 70° C. while supplying ethylene thereto. While maintaining the reaction temperature at 70° C., ethylene was continuously supplied so as to control the whole pressure to 0.6 MPa (gauge pressure), thereby conducting the polymerization for 5 hours. It was confirmed that the graft copolymer was produced at a yield of 705 g and had a meso-pentad fraction of propylene chains of 95.0% and an intrinsic viscosity [η] of 2.50 dl/g, and the yield of the propylene polymer at the first stage was 91% by mass.

The branched structure of the obtained propylene polymer was evaluated by the same method as in EXAMPLE 15-1. As a result, it was confirmed that the ratio $[(\alpha)^L/(\alpha)^B]$ was 1.05, i.e., exceeded 1 which indicated that the obtained polymer was a graft polymer.

3. Production of Polyolefin-Based Resin Composition

EXAMPLE 16-1

6.0 kg of the propylene (co)polymer obtained in EXAMPLE 14-1, 0.2 kg of the graft polymer obtained in EXAMPLE 15-1, 1.0 kg of talc (tradename "JM156" available from Asada Seifun Co., Ltd.), 3.0 kg of an ethylene-propylene rubber (tradename "EP02P" available from Japan Synthetic Rubber Co., Ltd.), 15 g of a phenol-based antioxidant "IRGANOX 1010" available from Ciba Specialty Chemicals Corp., and 5 g of an antioxidant "P-EPQ" available from Asahi Denka Kogyo Co., Ltd., were intimately premixed together and kneaded using a twin-screw extruder "TEX-30" (available from Nippon Seikosho Co., Ltd.) having a screw diameter of 32 mm at a cylinder set temperature of 200° C. at a screw-rotating speed of 300 rpm and an extrusion output of 10 kg/30 min to produce pellets of a polyolefin-based resin composition. The physical properties of the thus obtained composition were measured by the same methods as used in EXAMPLE 1. The results are shown in Table 4.

EXAMPLE 16-2

The same procedure as in EXAMPLE 16-1 was repeated except for using 7.0 kg of the propylene (co)polymer obtained in EXAMPLE 14-1, 2.0 kg of an ethylene-propylene rubber (tradename "EP02P" available from Japan Synthetic Rubber Co., Ltd.), 1.0 kg of talc (tradename "JM156" available from Asada Seifun Co., Ltd.) and 0.5 kg of the graft copolymer obtained in EXAMPLE 15-1 to produce pellets of a polyolefin-based resin composition. The physical properties of the thus obtained composition were measured by the same methods as described above. The results are shown in Table 4.

EXAMPLE 16-3

The same procedure as in EXAMPLE 16-2 was repeated except for using the graft copolymer obtained in EXAMPLE 15-1 in an amount of 1.5 kg to produce pellets of a polyolefin-based resin composition. The physical properties of the thus obtained composition were measured by the same methods as described above. The results are shown in Table 4.

EXAMPLE 16-4

The same procedure as in EXAMPLE 16-1 was repeated except for using 6.9 kg of the propylene (co)polymer obtained in EXAMPLE 14-2, 0.3 kg of the graft copolymer obtained in EXAMPLE 15-2, 0.6 kg of talc (tradename "JM156" available from Asada Seifun Co., Ltd.) and 2.5 kg of an ethylene-butene rubber (tradename "EBM3021P" available from Japan Synthetic Rubber Co., Ltd.) to produce pellets of a polyolefin-based resin composition. The physical properties of the thus obtained composition were measured by the same methods as described above. The results are shown in Table 4.

EXAMPLE 16-5

The same procedure as in EXAMPLE 16-4 was repeated except for using the graft copolymer obtained in EXAMPLE 15-2 in an amount of 1.2 kg to produce pellets of a polyolefin-based resin composition. The physical properties of the thus obtained composition were measured by the same methods as described above. The resutls are shown in Table 4.

EXAMPLE 16-6

The same procedure as in EXAMPLE 16-1 was repeated except for using 6.7 kg of the propylene (co)polymer obtained in EXAMPLE 14-4, 0.5 kg of the graft copolymer obtained in EXAMPLE 15-3, 2.3 kg of talc (tradename "JM156" available from Asada Seifun Co., Ltd.) and 1.0 kg of an ethylene-octene rubber (tradename "ENGAGE8842" available from DuPont Dow Inc.) to produce pellets of a polyolefin-based resin composition. The physical properties of the thus obtained composition were measured by the same methods as described above. The results are shown in Table 4.

EXAMPLE 16-7

The same procedure as in EXAMPLE 16-6 was repeated except for using the graft copolymer obtained in EXAMPLE 15-3 in an amount of 1.0 kg to produce pellets of a polyolefin-based resin composition. The physical properties of the thus obtained composition were measured by the same methods as in EXAMPLE 16-1. The results are shown in Table 4.

EXAMPLE 16-8

The same procedure as in EXAMPLE 16-1 was repeated except for using 7.5 kg of the propylene (co)polymer obtained in EXAMPLE 14-3, 0.5 kg of the graft copolymer obtained in EXAMPLE 15-4, 2.0 kg of talc (tradename "JM156" available from Asada Seifun Co., Ltd.) and 0.5 kg of SEBS (styrene-ethylene-butene block copolymer) (tradename "CLAYTON G1657" available from Shell Chemical Corp.) to produce pellets of a polyolefin-based resin composition. The physical properties of the thus obtained composition were measured by the same methods as described above. The results are shown in Table 4.

EXAMPLE 16-9

The same procedure as in EXAMPLE 16-8 was repeated except for using the propylene (co)polymer obtained in EXAMPLE 14-4 instead of the propylene (co)polymer obtained in EXAMPLE 14-3 to produce pellets of a polyolefin-based resin composition. The physical properties of the thus obtained composition were measured by the same methods as in EXAMPLE 16-1. The results are shown in Table 4.

COMPARATIVE EXAMPLE 16-1

The same procedure as in EXAMPLE 16-2 was repeated except for adding no copolymer (B) to produce pellets. The physical properties of the thus obtained composition were measured by the same methods as described above. The results are shown in Table 4.

COMPARATIVE EXAMPLE 16-2

The same procedure as in EXAMPLE 16-1 was repeated except for using 7.0 kg of the propylene (co)polymer obtained in EXAMPLE 14-6, 1.0 kg of talc (tradename "JM156" available from Asada Seifun Co., Ltd.) and 2.0 kg of an ethylene-propylene rubber (tradename "EP02P" available from Japan Synthetic Rubber Co., Ltd.) and adding no (co)polymer (B) to produce pellets. The physical properties of the thus obtained composition were measured by the same methods as described above. The results are shown in Table 4.

COMPARATIVE EXAMPLE 16-3

The same procedure as in EXAMPLE 16-4 was repeated except for adding no copolymer (B) to produce pellets. The physical properties of the thus obtained composition were measured by the same methods as described above. The results are shown in Table 4.

COMPARATIVE EXAMPLE 16-4

The same procedure as in EXAMPLE 16-1 was repeated except for using 6.9 kg of the propylene (co)polymer obtained in EXAMPLE 14-5, 2.5 kg of an ethylene-butene rubber (tradename "EBM3021P" available from Japan Synthetic Rubber Co., Ltd.) and 0.6 kg of talc (tradename "JM156" available from Asada Seifun Co., Ltd.) and adding no (co)polymer (B) to produce pellets. The physical properties of the thus obtained composition were measured by the same methods as described above. The results are shown in Table 4.

COMPARATIVE EXAMPLE 16-5

The same procedure as in EXAMPLE 16-6 was repeated except for adding no copolymer (B) to produce pellets. The physical properties of the thus obtained composition were measured by the same methods as described above. The results are shown in Table 4.

COMPARATIVE EXAMPLE 16-6

The same procedure as in EXAMPLE 16-1 was repeated except for using 6.7 kg of the propylene (co)polymer obtained in EXAMPLE 14-7, 2.3 kg of talc (tradename "JM156" available from Asada Seifun Co., Ltd.) and 1.0 kg of an ethylene-octene rubber (tradename "ENGAGE8842" available from DuPont Dow Inc.) and adding no (co)polymer (B) to produce pellets. The physical properties of the thus obtained composition were measured by the same methods as described above. The results are shown in Table 4.

COMPARATIVE EXAMPLE 16-7

The same procedure as in EXAMPLE 16-8 was repeated except for adding no copolymer (B) to produce pellets. The physical properties of the thus obtained composition were measured by the same methods as described above. The results are shown in Table 4.

COMPARATIVE EXAMPLE 16-8

The same procedure as in EXAMPLE 16-1 was repeated except for using 7.5 kg of the propylene (co)polymer obtained in EXAMPLE 14-5, 2.0 kg of talc (tradename "JM156" available from Asada Seifun Co., Ltd.) and 0.5 kg of SEBS (styrene-ethylene-butene block copolymer) (tradename "CLAYTON G1657" available from Shell Chemical Corp.) and adding no (co)polymer (B) to produce pellets. The physical properties of the thus obtained composition were measured by the same methods as described above. The results are shown in Table 4.

TABLE 4

|  | Flexural modulus (MPa) | 23° C. Izod impact strength (kJ/m$^2$) | −20° C. Izod impact strength (kJ/m$^2$) | Tensile elongation (%) |
| --- | --- | --- | --- | --- |
| Example 16-1 | 1,360 | 54 | 23 | >500 |
| Example 16-2 | 1,600 | 45 | 5.5 | 360 |
| Example 16-3 | 1,650 | 50 | 5.8 | >500 |
| Example 16-4 | 1,300 | 48 | 18 | >500 |
| Example 16-5 | 1,370 | 51 | 20 | >500 |
| Example 16-6 | 2,560 | 53 | 5.1 | >500 |
| Example 16-7 | 2,590 | 51 | 5.1 | >500 |
| Example 16-8 | 2,600 | 52 | 5.3 | >500 |
| Example 16-9 | 2,630 | 55 | 5.4 | >500 |
| Comparative Example 16-1 | 1,590 | 40 | 4.8 | 80 |
| Comparative Example 16-2 | 1,550 | 55 | 5.6 | 300 |
| Comparative Example 16-3 | 1,290 | 43 | 6.1 | 200 |
| Comparative Example 16-4 | 1,320 | 52 | 6.5 | >500 |
| Comparative Example 16-5 | 2,510 | 18 | 4.6 | 200 |
| Comparative Example 16-6 | 1,920 | 58 | 7.9 | >500 |
| Comparative Example 16-7 | 2,550 | 46 | 4.7 | 250 |
| Comparative Example 16-8 | 2,420 | 48 | 4.9 | 260 |

INDUSTRIAL APPLICABILITY

The polyolefin resin composition (I) of the present invention exhibits not only a high rigidity but also considerably improved impact strength, and has well-balanced physical properties. The polyolefin resin composition (II) of the present invention is capable of achieving a high rigidity and a high impact strength required in the field of industrial materials without using a high-performance catalyst or special polymerization methods, and has well-balanced physical properties. The polyolefin resin composition (III) of the present invention exhibits a good balance between fluidity, rigidity and impact strength, and is capable of realizing reduction in thickness and weight of molded articles produced therefrom. The polyolefin resin composition (IV) of the present invention exhibits not only a high rigidity but also considerably improved impact strength, and has well-balanced physical properties.

The invention claimed is:

1. A polyolefin-based resin composition comprising:
(A) 99.7 to 82% by mass of a propylene copolymer having (a) a melt flow rate (MFR) of 0.1 to 200 g/l 10 min, (b) a meso-pentad fraction [mmmm] of an ordinary temperature (25° C.) xylene-insoluble component of 97.0% or higher, and (c) a content of an ordinary temperature (25° C.) xylene-soluble component of 4 to 50% by mass; and
(B) 0.3 to 18% by mass of a copolymer containing propylene chains of an isotactic structure, and copolymer chains constituted from at least two monomer units selected from the group consisting of ethylene, $C_3$ to $C_{20}$ α-olefins, cyclic olefins and aromatic vinyl monomers which are graft-bonded and/or block-bonded to said copolymer,
wherein the propylene chains of an isotactic structure contained in said component (B) have a meso-pentad fraction [mmmm] of 40 to 99.9%, and said component (B) has an intrinsic viscosity [η] of 0.05 to 10 dl/g as measured at 135° C. in decalin, and contains polypropylene moieties in an amount of 40 to 98% by mass based on the amount of the copolymer (B).

2. The polyolefin-based resin composition according to claim 1, wherein said component (B) is at least one copolymer selected from the group consisting of [(B)-1] a copolymer having a graft bonding site formed by an olefin-based macromonomer and/or a polyene; [(B)-2] a copolymer having a block bonding site produced in the course of polymerization; and [(B)-3] a copolymer having both the graft bonding site defined by [(B)-1] and the block bonding site defined by [(B)-2].

3. A polyolefin-based resin composition, comprising:
(A) 99.7 to 82% by mass of a propylene copolymer having (a) a melt flow rate (MFR) of 0.1 to 200 g/10 min, (b) a meso-pentad fraction [mmmm] of an ordinary temperature (25° C.) xylene-insoluble component of 94.0% or higher and less than 97%, and (c) a content of an ordinary temperature (25° C.) xylene-soluble component of 4 to 50% by mass; and
(B) 0.3 to 18% by mass of a copolymer containing propylene chains of an isotactic structure, and copolymer chains constituted from at least two monomer units selected from the group consisting of ethylene, $C_3$ to $C_{20}$ α-olefins, cyclic olefins and aromatic vinyl monomers which are graft-bonded and/or block-bonded to said copolymer,
wherein the propylene chains of an isotactic structure contained in said component (B) have a meso-pentad fraction [mmmm] of 40 to 99.9%, and said component (B) has an intrinsic viscosity [η] of 0.05 to 10 dl/g as measured at 135° C. in decalin, and contains polypropylene moieties in an amount of 40 to 98% by mass based on the amount of the copolymer (B).

4. The polyolefin-based resin composition according to claim 3, wherein said component (B) is at least one copolymer selected from the group consisting of [(B)-1] a copolymer having a graft bonding site formed by an olefin-based macro-monomer and/or a polyene; [(B)-2] a copolymer having a block bonding site produced in the course of polymerization; and [(B)-3] a copolymer having both the graft bonding site defined by [(B)-1] and the block bonding site defined by [(B)-2].

5. A polyolefin-based resin composition, comprising:
100 parts by mass of a mixture comprising (A) 99.7 to 82% by mass of a propylene copolymer having (a) a melt flow rate (MFR) of 0.1 to 200 g/10 min and (b) a content of an ordinary temperature (25° C.) xylene-soluble component of 4 to 50% by mass, and (B) 0.3 to 18% by mass of a copolymer containing propylene chains of an isotactic structure, and copolymer chains constituted from at least two monomer units selected from the group consisting of ethylene, $C_3$ to $C_{20}$ α-olefins, cyclic olefins and aromatic vinyl monomers which are graft-bonded and/or block-bonded to said copolymer, wherein the propylene chains of an isotactic structure contained in said component (B) have a meso-pentad fraction [mmmm] of 40 to 99.9%, and said component (B) has an intrinsic viscosity [η] of 0.05 to 10 dl/g as measured at 135° C. in decalin, and contains polypropylene moieties in an amount of 40 to 98% by mass based on the amount of the copolymer (B); and (C) 3 to 40 parts by mass of an inorganic filler.

6. The polyolefin-based resin composition according to claim 5, wherein said component (B) is at least one copolymer selected from the group consisting of [(B)-1] a copolymer having a graft bonding site formed by an olefin-based macro-monomer and/or a polyene; [(B)-2] a copolymer having a block bonding site produced in the course of polymerization; and [(B)-3] a copolymer having both the graft bonding site defined by [(B)-1] and the block bonding site defined by [(B)-2].

7. A polyolefin-based resin composition, comprising:
(A) a propylene copolymer having (a) a melt flow rate (MFR) of 0.1 to 200 g/10 min and (b) a meso-pentad fraction [mmmm] of an ordinary temperature (25° C.) xylene-insoluble component of 94.0% or higher;
(B) a copolymer containing polypropylene chains of an isotactic structure, and copolymer chains constituted from at least two monomer units selected from the group consisting of ethylene, $C_3$ to $C_{20}$ α-olefins, cyclic olefins and aromatic vinyl monomers which are graft-bonded and/or block-bonded to said copolymer, wherein the propylene chains of an isotactic structure contained in said component (B) have a meso-pentad fraction [mmmm] of 40 to 99.9%, and said component (B) has an intrinsic viscosity [η] of 0.05 to 10 dl/g as measured at 135° C. in decalin, and contains polypropylene moieties in an amount of 40 to 98% by mass based on the amount of the copolymer (B);
(C) at least one inorganic filler selected from the group consisting of talc, mica and wollastonite; and
(D) at least one rubber component selected from the group consisting of ethylene-$C_3$ or more α-olefin copolymer elastomers, hydrogenated elastomers of styrene-diene copolymers and hydrogenated elastomers of diene (co) polymers,
said component (B) being contained in an amount of 0.1 to 20 parts by mass based on 100 parts by mass of a mixture containing the components (A), (C) and (D) at a mass ratio of (A)/(C)/(D) of 95 to 40/0 to 30/5 to 30.

8. The polyolefin-based resin composition according to claim 7, wherein said component (B) is at least one copolymer selected from the group consisting of [(B)-1] a copolymer having a graft bonding site formed by an olefin-based macro-monomer andlor a polyene; [(B)-2] a copolymer having a block bonding site produced in the course of polymerization; and [(B)-3] a copolymer having both the graft bonding site defined by [(B)-1] and the block bonding site defined by [(B)-2].

* * * * *